(12) United States Patent
Redfern et al.

(10) Patent No.: US 12,373,515 B2
(45) Date of Patent: *Jul. 29, 2025

(54) COMPUTATIONAL PRIMITIVES USING A MATRIX MULTIPLICATION ACCELERATOR

(71) Applicant: Texas Instruments Incorporated, Dallas, TX (US)

(72) Inventors: Arthur John Redfern, Plano, TX (US); Timothy David Anderson, University Park, TX (US); Kai Chirca, Dallas, TX (US); Chenchi Luo, Plano, TX (US); Zhenhua Yu, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,703

(22) Filed: Apr. 12, 2024

(65) Prior Publication Data
US 2024/0265062 A1    Aug. 8, 2024

Related U.S. Application Data

(63) Continuation of application No. 17/367,389, filed on Jul. 4, 2021, now Pat. No. 11,960,567, which is a (Continued)

(51) Int. Cl.
*G06F 17/16* (2006.01)
*G06F 17/14* (2006.01)
(Continued)

(52) U.S. Cl.
CPC ............ *G06F 17/16* (2013.01); *G06F 17/141* (2013.01); *G06N 3/045* (2023.01); *G06N 3/063* (2013.01)

(58) Field of Classification Search
CPC ............................. G06F 17/16; G06F 17/141
See application file for complete search history.

(56) References Cited

U.S. PATENT DOCUMENTS

| 4,897,717 A | 1/1990 | Hamilton et al. |
| 5,099,447 A | 3/1992 | Myszewski |

(Continued)

FOREIGN PATENT DOCUMENTS

| CN | 101933005 | 12/2010 |
| CN | 103714044 | 4/2014 |

(Continued)

OTHER PUBLICATIONS

Utku Aydoinat, et al."An Open CL(TM) Deep Learning Accelerator on Arria 10", arxiv.org,Cornell University Library, 201 Olin Library, Cornell University Ithaca, NY 14853, Jan. 13, 2017, XP080741254.

(Continued)

*Primary Examiner* — Michael D. Yaary
(74) *Attorney, Agent, or Firm* — Carl G. Peterson; Frank D. Cimino

(57) ABSTRACT

A method for performing a fundamental computational primitive in a device is provided, where the device includes a processor and a matrix multiplication accelerator (MMA). The method includes configuring a streaming engine in the device to stream data for the fundamental computational primitive from memory, configuring the MMA to format the data, and executing the fundamental computational primitive by the device.

20 Claims, 12 Drawing Sheets

Related U.S. Application Data continuation of application No. 15/907,356, filed on Feb. 28, 2018, now Pat. No. 11,086,967.

(60) Provisional application No. 62/465,620, filed on Mar. 1, 2017.

(51) Int. Cl.
*G06N 3/045* (2023.01)
*G06N 3/063* (2023.01)

(56) References Cited

U.S. PATENT DOCUMENTS

| | | | |
|---|---|---|---|
| 5,745,793 | A | 4/1998 | Atsatt et al. |
| 5,870,568 | A | 2/1999 | Culley et al. |
| 5,982,375 | A | 11/1999 | Nelson et al. |
| 8,301,749 | B1 | 10/2012 | Finklestein et al. |
| 9,606,803 | B2 | 3/2017 | Anderson et al. |
| 9,645,974 | B1 | 5/2017 | Patil et al. |
| 10,114,613 | B2 | 10/2018 | Bekas et al. |
| 2002/0191692 | A1 | 12/2002 | Fallon et al. |
| 2004/0136316 | A1 | 7/2004 | Kwak et al. |
| 2006/0095721 | A1* | 5/2006 | Biles .................. G06F 9/30054 712/34 |
| 2009/0292758 | A1 | 11/2009 | Brokenshire et al. |
| 2009/0300091 | A1 | 12/2009 | Brokenshire et al. |
| 2011/0153707 | A1 | 6/2011 | Ginzburg et al. |
| 2012/0011348 | A1 | 1/2012 | Eichenberger et al. |
| 2012/0072917 | A1 | 3/2012 | Boldyrev et al. |
| 2012/0140814 | A1 | 6/2012 | Rojal et al. |
| 2012/0216096 | A1 | 8/2012 | Seo et al. |
| 2012/0251013 | A1 | 10/2012 | Porikli |
| 2012/0268298 | A1 | 10/2012 | Oh |
| 2013/0262548 | A1 | 10/2013 | Ge et al. |
| 2014/0167987 | A1 | 6/2014 | Pell et al. |
| 2014/0365548 | A1 | 12/2014 | Mortensen |
| 2015/0019840 | A1 | 1/2015 | Anderson |
| 2016/0373158 | A1 | 12/2016 | Ardalan |
| 2017/0139710 | A1 | 5/2017 | Zbiciak |
| 2017/0153890 | A1 | 6/2017 | Anderson et al. |
| 2017/0153959 | A1 | 6/2017 | Zbiciak |
| 2017/0168898 | A1 | 6/2017 | Zbiciak et al. |
| 2017/0249150 | A1 | 8/2017 | Zbiciak et al. |
| 2017/0308381 | A1 | 10/2017 | Zbiciak |
| 2019/0266218 | A1 | 8/2019 | Scott et al. |
| 2020/0051551 | A1 | 2/2020 | Sainath et al. |

FOREIGN PATENT DOCUMENTS

| | | |
|---|---|---|
| CN | 104899182 | 9/2015 |
| CN | 104915322 | 9/2015 |
| CN | 106228238 | 12/2016 |
| JP | 2481338 | 1/1997 |

OTHER PUBLICATIONS

Hussain Tassadaq, et al. "PPMC: A Program Pattern Based Mwmory Controller", Mar. 19, 2012, International Conference on Financial Cryptography and Data Security; [Lecture Notes in Computer Science; Lect. Noptes Computer], Springer, Berlin, Heidelberg, pp. 89-101, XP047379471, ISBN: 978-3-642-17318-9.

Chen Zhang et al. "Optimizing FPGA-based Accelerator Design for Deep Convolutional Neural Networks", Proceedings of the 2015 ACM/SIGDA International Symposium of Field-Programmable Gate Arrays, FPGA, 15, Feb. 22, 2015, pp. 161-170, XP055265150, New, NY, USA, DOI: 10.1145/2684746.2689060, ISBN:978-45033315-3.

PCT Search Report and Written Opinion (PCT/US 2018/020334).

Chinese Office Action and Search Report for Application No. 2018800135448 dated Mar. 2, 2023.

Chinese Office Action and Search Report for Application No. 2018800136987 dated Dec. 1, 2022.

National Intellectual Property Administration, PRC Search Report, Chinese Patent Application No. 2018800144945, dated Mar. 10, 2023, 2 pages.

Qiao et al., FPGA-Accelerated Deep Convolutional Neural Networks for High Throughput and Energy Efficiency, dated May 16, 2016, 20 pages.

Office Action for European Application No. 18760733.8, Oct. 21, 2021, 6 pages.

* cited by examiner

COMPUTATIONAL PRIMITIVES USING A MATRIX MULTIPLICATION ACCELERATOR

CROSS-REFERENCE TO RELATED APPLICATIONS

This application is a continuation of U.S. patent application Ser. No. 17/367,389, filed Jul. 4, 2021, currently pending and scheduled to grant as U.S. Pat. No. 11,960,567 on Apr. 16, 2024, which is a continuation of U.S. patent application Ser. No. 15/907,356, filed Feb. 28, 2018, which claims benefit of U.S. Provisional Patent Application No. 62/465,620, filed Mar. 1, 2017, the entireties of all of which are incorporated herein by reference.

BACKGROUND

Applications such as speech recognition, intelligent industrial control, object detection and recognition, and vision are increasingly being migrated to embedded devices. Hardware acceleration may be needed in such devices to support the computational needs of the algorithms used in such applications.

SUMMARY

Examples of the present disclosure relate to implementing fundamental computational primitives using a matrix multiplication accelerator. In one aspect, a method for performing a fundamental computational primitive in a device is provided, where the device includes a processor and a matrix multiplication accelerator (MMA). The method includes configuring a streaming engine in the device to stream data for the fundamental computational primitive from memory, configuring the MMA to format the data, and executing the fundamental computational primitive by the device.

In one aspect, a device is provided that includes a memory, a processor coupled to the memory, and a matrix multiplication accelerator (MMA) coupled to the processor, the MMA including a multiplier buffer and a first multiplicand buffer, wherein the device is operable to configure a streaming engine in the device to stream data for a fundamental computational primitive from the memory, configure the MMA to format the data and execute the fundamental computational primitive.

BRIEF DESCRIPTION OF THE DRAWINGS

FIG. 6 is an example illustrating implementation of matrix matrix addition in the device of FIG. 1;

FIG. 12 is an example illustrating implementation of matrix row permutation in the device of FIG. 1;

DETAILED DESCRIPTION

Figure 1:
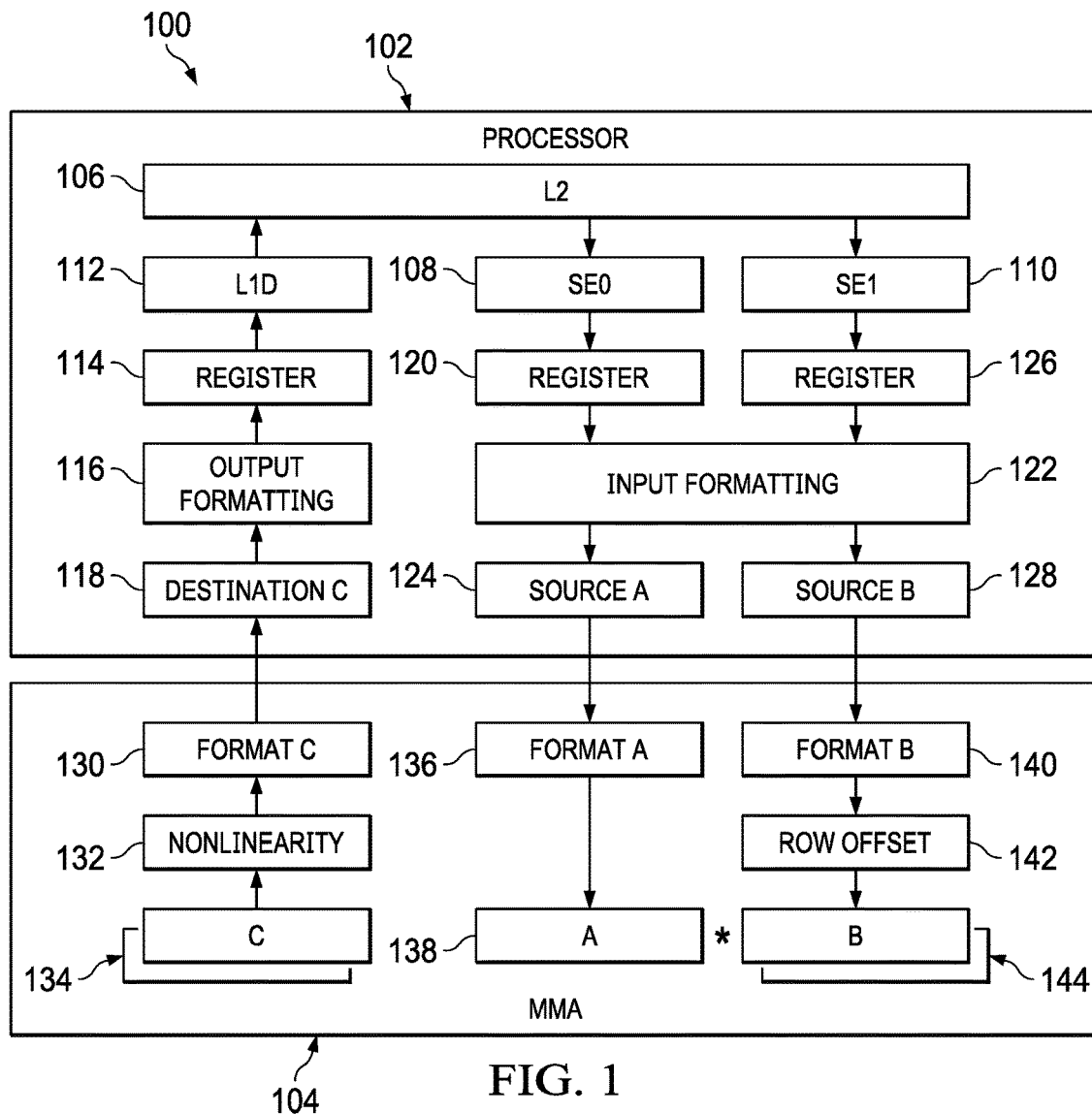
FIG. 1 depicts an example device configurable to implement fundamental computational primitives using a matrix multiplication accelerator (MMA) coupled to a processor.

Specific examples of the disclosure will now be described in detail with reference to the accompanying figures. Like elements in the various figures are denoted by like reference numerals for consistency.

Examples of the disclosure provide for implementing fundamental computational primitives used by applications such as speech recognition, intelligent industrial control, object detection and recognition, and vision using a matrix multiplication accelerator (MMA). The fundamental computational primitives include, for example, two-dimensional (2D) convolution as used in convolutional neural networks (CNNs), small and large matrix matrix multiplication, matrix matrix point wise multiplication, matrix matrix addition, vector matrix multiplication, vector summation, affine transformation, fast Fourier transform, discrete cosign transform, convolution, correlation, matrix assignment, matrix permutation, and matrix transposition.

FIG. 1 depicts an example device 100 configurable to implement fundamental computational primitives such as those previously mentioned herein using a matrix multiplication accelerator (MMA) 104 coupled to a processor 102. The MMA 104 includes functionality to perform matrix multiplication. Matrix multiplication is a binary operation that produces a matrix from two matrices. More specifically, if a multiplier matrix A is an M×K matrix and a multiplicand matrix B is a K×N matrix, the matrix product of these two matrices is an M×N matrix C in which the m elements across a row n of A are multiplied with the m elements down a column K of B and summed to produce an element $C_{mn}$.

The MMA 104 includes sufficient memory to store two 32×32 multiplicand buffers 144 of 16-bit elements for storing two B matrices and two 32×32 result buffers 134 of 16-bit elements for storing two C matrices. The multiplicand buffers 144 may be referred to as B matrix buffers herein and the result buffers 134 may be referred to as C matrix buffers herein. The MMA 104 further includes memory to store a 1×32 multiplier buffer 138 of 16-bit elements for storing a row of the multiplier matrix A. The multiplier buffer 138 may be referred to as the A matrix buffer herein. As is explained in more detail herein, the B matrix buffers 144 are used as ping pong buffers in some operations such that data is loaded into one of the buffers in background as data in the other buffer is used for operation execution. Similarly, the C matrix buffers 134 are used as foreground and background buffers such that, e.g., the results of operation execution are stored in one buffer while the contents of another buffer are output from the MMA 104.

On each cycle, the MMA 104 performs a single instruction, i.e., a Load, Store, and Execute instruction, referred to as the LSE instruction herein. As the name of this instruction implies, the MMA 104 can perform a load operation, a store operation, and an execute operation in a single cycle. In general, in a cycle, a vector of data is loaded into the A matrix buffer 138 and a matrix multiplication operation is performed between a B matrix stored in a selected B matrix buffer 144 and the data vector in the A matrix buffer 138. That is, the matrix product of the data vector in the A matrix buffer 138 with each column of the B matrix in the selected B matrix buffer 144 is computed. The result of the matrix multiplication operation is a row of data elements that is stored in a row of a C matrix in a selected C matrix buffer 134. Depending on the content of the fields of the LSE instruction, a cycle can also include loading a row of data in the B matrix buffer not being used for the matrix multiplication, i.e., the background B matrix buffer, storing a row of data from a C matrix buffer into external memory, and/or performing a specified operation on the results of the matrix product operations before storing the results in the selected C matrix buffer 134.

The load operation portion of the LSE instruction includes fields identifying the location in the buffer 124 of the data to be loaded into the A matrix buffer 138, the location in the buffer 128 of the data to be loaded in a B matrix buffer 144, the B matrix buffer 144 that is the target of the load operation, and the row in target B matrix buffer to be loaded. The load operation portion also includes a field for indicating whether a load operation is to be performed.

The store operation portion of the LSE instruction includes fields identifying the location in the buffer 118 where the data in a C matrix buffer 134 is to be stored, the C matrix buffer 134 holding the data to be stored, and the row in the target C matrix buffer 134 containing the data to be stored. The store operation portion also includes a field for indicating whether a store operation is to be performed.

The execute operation portion of the LSE instruction includes fields identifying the target C matrix buffer 134 and the row in the target C matrix buffer 134 that is to receive the result of the execute operation, and the operation to be performed with the results of the matrix multiplication before storing in the target C matrix buffer 134. The operations that can be specified include =, +=, -=, or none. The = operation causes the results to be directly stored in the specified row with no alteration. The += operation causes elements in the results to be added to corresponding elements in the specified row, with the results of the additions replacing the contents of the specified row. The -= operation causes elements in the results to be subtracted from corresponding elements in the specified row, with the results of the subtractions replacing the contents of the specified row. The none operation, as the name implies, indicated that no operation is to be performed. The none operation is used, for example, during the initial load of data into a B matrix buffer 144 prior to performing the matrix multiplication or when moving the final results stored in a C matrix buffer 134 out of the MMA 104.

The MMA 104 further includes configurable format components 130, 136, 140 for formatting, respectively, the data output by the MMA 104 and the data input to the MMA 104. The format A component 136 and the format B component 140 are configurable to format the respective input data according to a specified type, e.g., 16-bit float, 16-bit fixed signed, 16-bit fixed unsigned, 8-bit fixed signed, and 8-bit fixed unsigned, and the Q point, i.e., the number of fractional bits, for fixed point inputs. The format C component 130 is configurable to format the output data according to a specified type, e.g., 16-bit float, 16-bit fixed signed, 16-bit fixed unsigned, 8-bit fixed signed, and 8-bit fixed unsigned, and the Q point, i.e., the number of fractional bits, for fixed point outputs. The format A component 136 is further configurable to define a look-up table (LUT) that allows the A data in L2 106 to be stored in 4-bit precision to save memory and expanded to 16-bit precision in the A matrix buffer 138 using a mapping of 4 bits to 16 bits that doesn't need to be uniform. This is potentially useful for all computational primitives and is particularly useful for CNN style 2D convolution.

The MMA 104 also includes a row offset component 142 that is configurable to specify an offset for each element of a row of data to be loaded in a B matrix buffer 144. The row offset component 142 stores thirty-two five-bit offset values, one for each of the thirty-two elements in a row. The row offset values specified in the row offset component 142 can be used to place elements in a row of data elements being loaded into different rows in the background B matrix buffer different from the row number specified in the load portion of the LSE instruction. The offset value corresponding to a data element is added to the row number of the B matrix buffer specified in the load portion of the LSE instruction to determine the row of the B matrix buffer in which the data element will be loaded. The column number of the data element is not affected.

More specifically, on a cycle of the MMA 104, a new row of data can be loaded into the background B matrix buffer, i.e., the B matrix buffer 144 that is not being used for execution. If the row offset values in the row offset component 142 for all elements in the row of data are zero, the data elements will be loaded in the row of the background B matrix buffer specified in the LSE instruction for the cycle. For example, when loading a new row of data in the first row of the background B matrix buffer, the first element will be loaded in row 1, column 1, the second element will be loaded in row 1, column 2, etc. However, if a row offset value in the row offset component 142 is non-zero, the row in which the corresponding data element is loaded is determined by the row specified in the LSE instruction and the row offset value. For example, assume the row offset values are 0, 1, 2, ... 31. When loading a new row of data in which the first row of the background B matrix buffer is specified in the LSE instruction, the first element will be loaded in row 1, column 1, the second element will be loaded in row 2, column 2, the third element will be loaded in row 3, column 3, etc., thus forming a diagonal in the background B matrix buffer.

The MMA 104 further includes a configurable nonlinearity component 132 for applying a nonlinearity to the output of a C matrix buffer 134. The nonlinearity implemented is a rectifying linear unit (ReLU) and, if activated, is applied to the output of a C matrix buffer 134 on an elementwise basis as follows: if the input to the nonlinearity component 132 is negative, set the output of the nonlinearity component 132 to zero, and if the input to the nonlinearity component 132 is non-negative, set the output of the nonlinearity component 132 to the input of the nonlinearity.

In the example device 100, the processor 102 is a digital signal processor (DSP) that includes a level one data (L1D) cache memory 112, a level 2 (L2) unified instruction and data cache memory 106, and two streaming engines (SE0 and SE1) 108, 110. Examples of such a processor are described in U.S. Pat. No. 9,606,803, issued Mar. 28, 2017, which is incorporated by reference herein. Further, examples of streaming engines are described in U.S. Pat. No. 9,606,803 and United States Patent Application Publication 2017/0308381, published Oct. 26, 2017, which is incorporated by reference herein.

The processor 102 is configured to operate as a source of input data for the MMA 104 and to receive output data from the MMA 104. More specifically, the processor 102 is configured to receive data vectors for the MMA 104 from the streaming engines 108, 110 in respective register files 120, 126, to apply formatting 122 to the data as needed for the fundamental computational primitive being executed by the device 100, and store the data vectors in respective buffers 124, 128 for consumption by the MMA 104. The source A buffer 124 stores the data to be loaded into the A matrix buffer 138 and the source B buffer 128 stores the data to be loaded into a B matrix buffer 144.

Examples of input formatting 122 include zero padding, even/odd vector generation, value copying, known matrix creation, and linked operations. Even/odd vector generation receives two vectors. If the even option is selected, all even number elements of the two vectors are used to create the output vector for input to the MMA 104. If the odd option is selected, all odd number elements of the two vectors are used to create the output vector. The even/odd formatting is useful, for example, for fast Fourier transforms (FFTs) and convolutions using a stride greater than one. Value copying formatting generates a vector for input to the MMA 104 in which a scalar value read from L2 106 is replicated to all elements of the vector. Value copying is useful, for example, for bias creation. Known matrix creation formatting creates a sequence of output vectors for input to the MMA 104 that together form a common known matrix pattern, e.g., an identity matrix. Zero padding formatting adds zeros to a vector prior to input to the MMA 104. Linked operations take output vectors of the MMA 104 and provide the vectors as input to the MMA 104 for the A matrix buffer 138 or a B matrix buffer 144. Linked operations are useful for example, for Z=W*X*Y style operations.

The processor 102 is also configured to receive data vectors from the MMA 104 in the destination C buffer 118, to apply formatting 116 to the data as needed for the fundamental computational primitive being executed by the device 100, and to store the data vectors in the register file 114. The data vectors are stored into external memory (not shown) via the level one data cache 112 and the level two unified cache 106. Examples of output formatting 116 include seam removal, stride removal, zero padding, and matrix transpose.

The streaming engines 108, 110 are configured to transfer streams of data elements from the level two cache 106 to respective register files 120, 126. A stream is defined to be a sequence of elements of the same type and size. The streaming engines 120, 126 are programmable to define a stream specific to a fundamental computational primitive by specifying the following stream attributes: address of the first element of the stream, size and type of the elements in the stream, formatting for the data in the stream, and the address sequence associated with the stream, i.e., the addressing order in which to access the elements to place them in the stream. When a stream is opened, a streaming engine 120, 126 calculates the address, fetches the defined data type from L2, performs any specified data type formatting, e.g., zero extension or sign extension, maps the data into vectors, and delivers the data vectors directly to a respective register file 120, 126.

The addressing sequence of the streaming engines 108, 110 permits multi-dimensional memory accesses. That is, each streaming engine 120, 126 executes an address sequence for elements of a stream in terms of a pointer walking through memory. Each streaming engine 120, 126 implements a multiple-level parameterized nested loop that controls the path the pointer takes. In this nested loop, an iteration count for a loop level indicates the number of times the loop at that level repeats and a dimension for a loop level defines the distance between pointer positions in the loop level.

The innermost loop, i.e., loop 0, consumes physically contiguous elements from memory and has an implicit dimension of one and the pointer moves from element to element in consecutive, increasing order in this loop level. In each level outside the inner loop, a loop moves the pointer to a new location based on the size of the dimension specified for the loop. This form of addressing allows programs to specify regular paths through memory in a small number of parameters Table 1 shows example pseudo code for such a nested loop with six levels. In this pseudo code, ICNTx is the iteration count for level x, DIMx is the dimension for level x, and ELEM_BYTES is the size of each element in bytes. In other examples, the nested loop may have more or fewer levels.

TABLE 1

```
// loop 5
for (i5 = 0; i5 < ICNT5; i5++) {
    ptr5 = ptr;        // save 5
    // loop 4
    for (i4 = 0; i4 < ICNT4; i4++) {
        ptr4 = ptr;        // save 4
        // loop 3
        for (i3 = 0; i3 < ICNT3; i3++) {
            ptr3 = ptr;        // save 3
            // loop 2
            for (i2 = 0; i2 < ICNT2; i2++) {
                ptr2 = ptr;        // save 2
                // loop 1
                for (i1 = 0; i1 < ICNT1; i1++) {
                    ptr1 = ptr;        // save 1
                    // loop 0
                    for (i0 = 0; i0 < ICNT0; i0++) {
                        // read data and update 0
                        val = fetch(ptr, ELEM_BYTES);
                        ptr = ptr + ELEM_BYTES;
                    }
                    ptr = ptr1 + DIM1; // update 1
                }
                ptr = ptr2 + DIM2;   // update 2
            }
            ptr = ptr3 + DIM3;      // update 3
        }
        ptr = ptr4 + DIM4;          // update 4
    }
    ptr = ptr5 + DIM5;              // update 5
}
```

The processor 102 also executes control software for each fundamental computational primitive defined for the device 100. The control software causes configuration of the streaming engines 108, 110 and the MMA 104 as needed to execute the fundamental computational primitive, controls the execution of the MMA, and causes the application of any input formatting 122 and/or output formatting 116 needed for the fundamental computational primitive.

Figure 2:
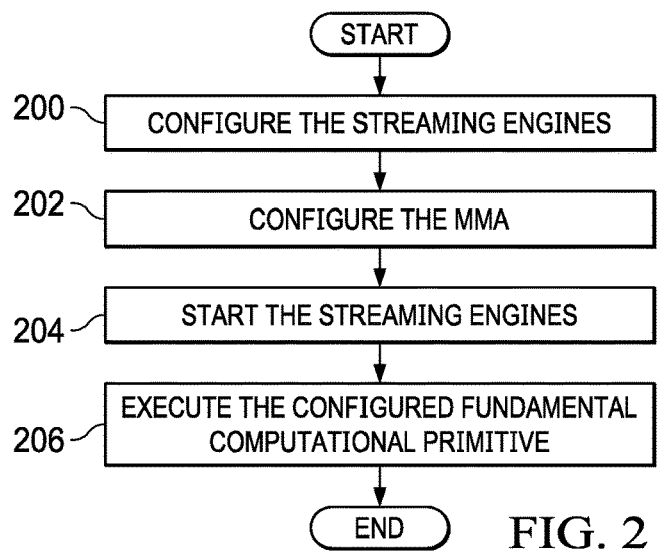
FIG. 2 is a flow diagram of a method for executing a fundamental computational primitive in the device of FIG. 1.

FIG. 2 is a flow diagram of a method for executing a fundamental computational primitive in the device 100. Initially, control software for the fundamental computational primitive configures 200 the streaming engines 108, 110 to stream the data elements for the fundamental computational primitive in the required order. That is, the control software communicates stream attributes of the fundamental computational primitive to each of the streaming engines 108, 110. Depending on the fundamental computational primitive, one or both streaming engines may be used. In general, the streaming engine 108 is configured to stream the data elements for the A matrix buffer 138 and the streaming engine 110 is configured to stream the data elements for a B matrix buffer 144. Examples of configuring the streaming engines 108, 110 for different fundamental computational primitives are described herein.

The control software also configures 202 the MMA 104 as needed to perform the fundamental computational primitive using matrix multiplication. That is, the control software configures the format components 130, 136, 140, the row offset component 142, and the nonlinearity component 132 as needed for the fundamental computational primitive. Examples of configuring the MMA 104 for different computational primitives are described herein.

Once the configuration is complete, the control software starts 204 the configured streaming engines 108, 110 and executes 206 the configured fundamental computational primitive. In general, to execute the fundamental computational primitive, the control software causes the MMA 104 to execute a sequence of LSE instructions to load data elements into the A matrix buffer 138 and a background B matrix buffer 144, to execute the matrix multiplication between the A matrix buffer 138 and the foreground B matrix buffer 144, to store the result of the matrix multiplication in a selected C matrix buffer 134, and to move data from a background C matrix buffer 134 to the buffer 118. Note that any formatting and offsets configured in the MMA 104 are applied before data elements are loaded in the buffers 138, 144 and when results are moved from a C matrix buffer 134 to the buffer 118. As part of execution of the fundamental computational primitive, the control software may also cause input formatting 122 and output formatting 116 specific to the fundamental computational primitive to be performed on the processor 102.

Figure 3:
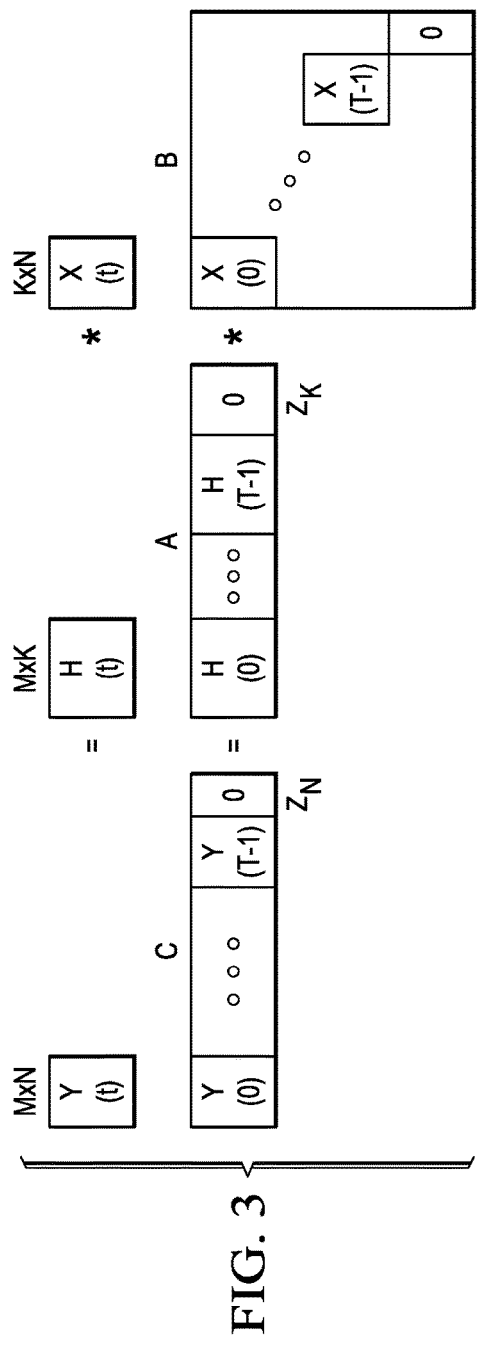
FIG. 3 is an example illustrating implementation of batch small matrix matrix multiplication in the device of FIG. 1.

FIG. 3 is an example illustrating implementation of batch small matrix matrix multiplication in the device 100 of FIG. 1. For sufficiently small matrices, multiple matrix multiplications Y=H*X can be performed in a single batch by loading multiple multiplicand matrices X diagonally in a B matrix buffer 144 and multiplying with the corresponding multiplier matrices H loaded in the A matrix buffer 138. As shown in FIG. 3, assume the multiplicand matrixes are K×N and the corresponding multiplier matrices are M×K, where K, N, and M are less than 32. The batch size T, i.e., the number of multiplicand matrices X that can be loaded into a B matrix buffer 144 diagonally, is T=floor(32/max(K,N)). Thus, T multiplicand matrices X(t), t=0, 1, . . . , T−1, can be loaded diagonally in a B matrix buffer 144 and there will be T multiplier matrices H(t).

To perform this primitive, the T H matrices are stored in the L2 cache 106 such that there are T*K contiguous elements containing the first row of each of the T H matrices followed by $Z_k$ zeros, T*K contiguous elements containing the second row of each of the T H matrices followed by $Z_k$ zeros, . . . , T*K contiguous elements of the Mth row of each of the H matrices followed by $Z_k$ zeros, where $Z_K$=32−T*K. In addition, the T X matrices are stored the L2 cache 106 such that there are T*N contiguous elements containing the first row of each of the T X matrices followed by $Z_N$ zeros, T*N contiguous elements containing the second row of each of the T X matrices followed by $Z_N$ 0 s, . . . , T*N contiguous elements of the Mth row of each of the T X matrices followed by $Z_N$ 0 s, where $Z_N$=32−T*N.

The streaming engine 110 is configured to read the elements of the T X matrices from the L2 cache 106 and provide vectors for loading in a B matrix buffer 144 of the MMA 104 that contain elements of successive rows of the T X matrices. The streaming engine 108 is configured to read the elements of the T H matrices from the L2 cache 106 and provide vectors for loading in the A matrix buffer 138 that contain elements of successive rows of the T H matrices.

The row offset component 140 of the MMA 104 is configured to cause the elements of the rows in each vector from the streaming engine 110 to be loaded at an offset t*K in a B matrix buffer 144. Thus, the elements of a row from X(0) are loaded with an offset of 0, the elements of the row from X(1) are loaded with an offset of K, the elements of the row from X(2) are loaded with an offset of 2K, etc.

To perform the multiplication, appropriately configured LSE instructions are executed on the MMA 104 to load a B matrix buffer 144 with an initial batch of X matrices. Once a B matrix buffer is loaded, further LSE instructions are executed to load the rows of the corresponding H matrices in the A matrix buffer 138, perform the multiplication, and store the results in a C matrix buffer 134. Further, if multiple batches are to be processed, the LSE instructions will also load another batch of X matrices in a background B matrix buffer 144 and move the results of a previous batch from a C matrix buffer 134 out of the MMA 104. Thus, to perform the batch small matrix matrix multiplication, T*K elements are loaded into the A matrix buffer 138 for M cycles, T*N elements are loaded into a B matrix buffer 144 (in background except for the initial batch) for K cycles, and T*N elements are moved out of a C matrix buffer for M cycles.

In other examples, rather than storing the $Z_K$ and $Z_N$ zeros in the L2 cache 106, the streaming engines 108, 110 or the input formatting 122 are configured to perform zero padding to add the required number of zeros to each vector prior to storing the vectors in the source A buffer 124 or the source B buffer 128.

Figure 4:
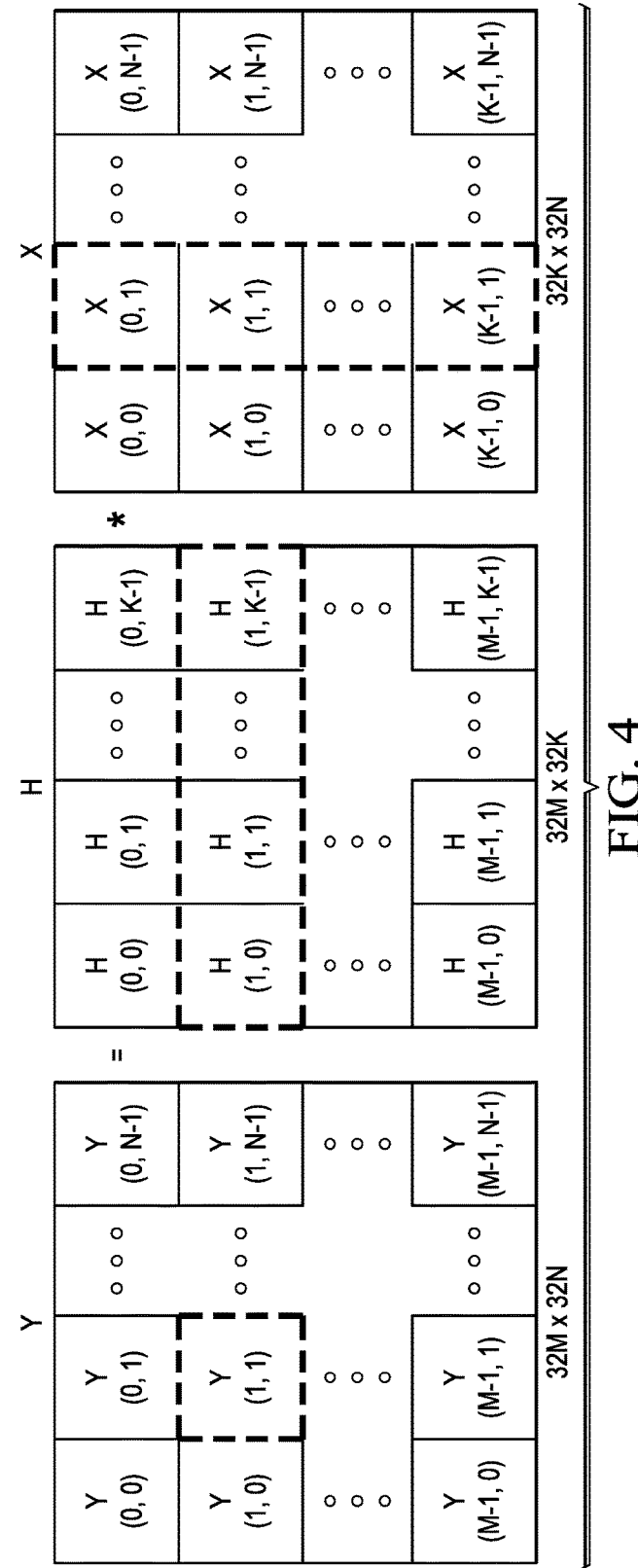
FIG. 4 is an example illustrating implementation of large matrix matrix multiplication in the device of FIG. 1.

FIG. 4 is an example illustrating implementation of large matrix matrix multiplication Y=H*X in the device 100 of FIG. 1 where the multiplicand matrix X and the multiplier matrix H have dimensions larger than a B matrix buffer 144 and the A matrix buffer 138. This example assumes that the dimensions of the multiplicand matrix X are 32K×32N and of the multiplier matrix H are 32M×32K, i.e., that each dimension of these matrices is evenly divisible by 32. Thus, the dimensions of the Y matrix are 32M×32N. The matrices X and H are divided into 32×32 tiles. That is, a tile T(m, n) of a matrix is formed from rows (32*m):32*((m+1)−1) and columns (32*n):(32*(n+1)−1). As illustrated in FIG. 4, matrix multiplication of a row of H tiles with a column of X tiles generates a single corresponding Y tile, e.g., tile Y(1,1) is generated by matrix multiplication of tile row 1 of H with tile column 1 of X.

Table 2 is example pseudo code illustrating performance of this primitive by the MMA 104. The pseudo code assumes that the streaming engine 108 is configured to read elements of the multiplier matrix H from the L2 cache 106 and to provide vectors to the A matrix buffer 138 such that each row of H tiles is loaded N times, i.e., H(0, 0:(K−1)) is loaded N times, H(1, 0:(K−1)) is loaded N times, H(2, 0:(K−1)) is loaded N times, etc. That is, all rows of the H matrix are stored in the L2 cache 106 consecutively. The streaming engine 108 is configured to load the following sequence N times: H(0, 0), H(0, 1), . . . , H(0, K−1); then the following sequence N times: H(1, 0), H(1, 1), . . . , H(1, K−1); . . . ; then the following sequence N times: H(M−1, 0), H(M−1, 1), . . . H(M−1, K−1).

The pseudo code also assumes that the streaming engine 110 is configured read element of X tiles form the L2 cache 106 and to provide each X tile M times to be loaded in a B matrix buffer 144, i.e., a sequence of loading [X(0:(K−1), 0), . . . , X(0:(K−1), N−1)] is repeated M times. That is, all rows of the X matrix are stored in the L2 cache 106 consecutively. The streaming engine 110 is configured to load the following sequence N times: X(0, 0), X(1, 0), . . . X(K−1, 0), X(0, 1), X(1, 1), . . . , X(K−1, 1), . . . , X(0, N−1), X(1, N−1), . . . , X(K−1, N−1).

In this pseudo code, Bback refers to the current background buffer of the B matrix buffers 144 and Bfore refers to the current foreground buffer used for execution.

TABLE 2

```
// initialize for 32 cycles (load Bback(i, :), i = 0, ..., 31)
load Bback (X(0, 0))
// cycle through the tile rows of H
for (m = 0; m < M; m++) {
   // cycle through the tile columns of X
   for (n = 0; n < N; n++) {
      // multiply tile row of H with tile column of X
      for (k = 0; k < K; k++) {
         // swap Bfore and Bback
         Bfore <--> Bback
         // parallel compute (store C(i − 1, :), load Bback(i, :),
         // compute C(i, :) += A(i, :)*Bfore, i = 0, ..., 31)
         for (c = 0; c < 32; c++) {
            if ((k == 0) && ((m != 0) or (n != 0)))
               (store C (current Y(m, n) 1 row delayed)}
            if ((m != (M − 1)) || (n != (N − 1)) || (k != (K − 1)))
               {load Bback (next X(k, n))}
            if (k == 0)
               {compute C = A*Bfore (Y(m, n) = H(m, 0)*X(0, n))}
            if (k != 0)
               {compute C += A*Bfore (Y(m, n) += H(m, k)*X(k, n))}
         }
      }
   }
}
// finish for 1 cycle (store C(31, :))
store C row 31 (Y(M − 1, N − 1))
```

Figure 5:
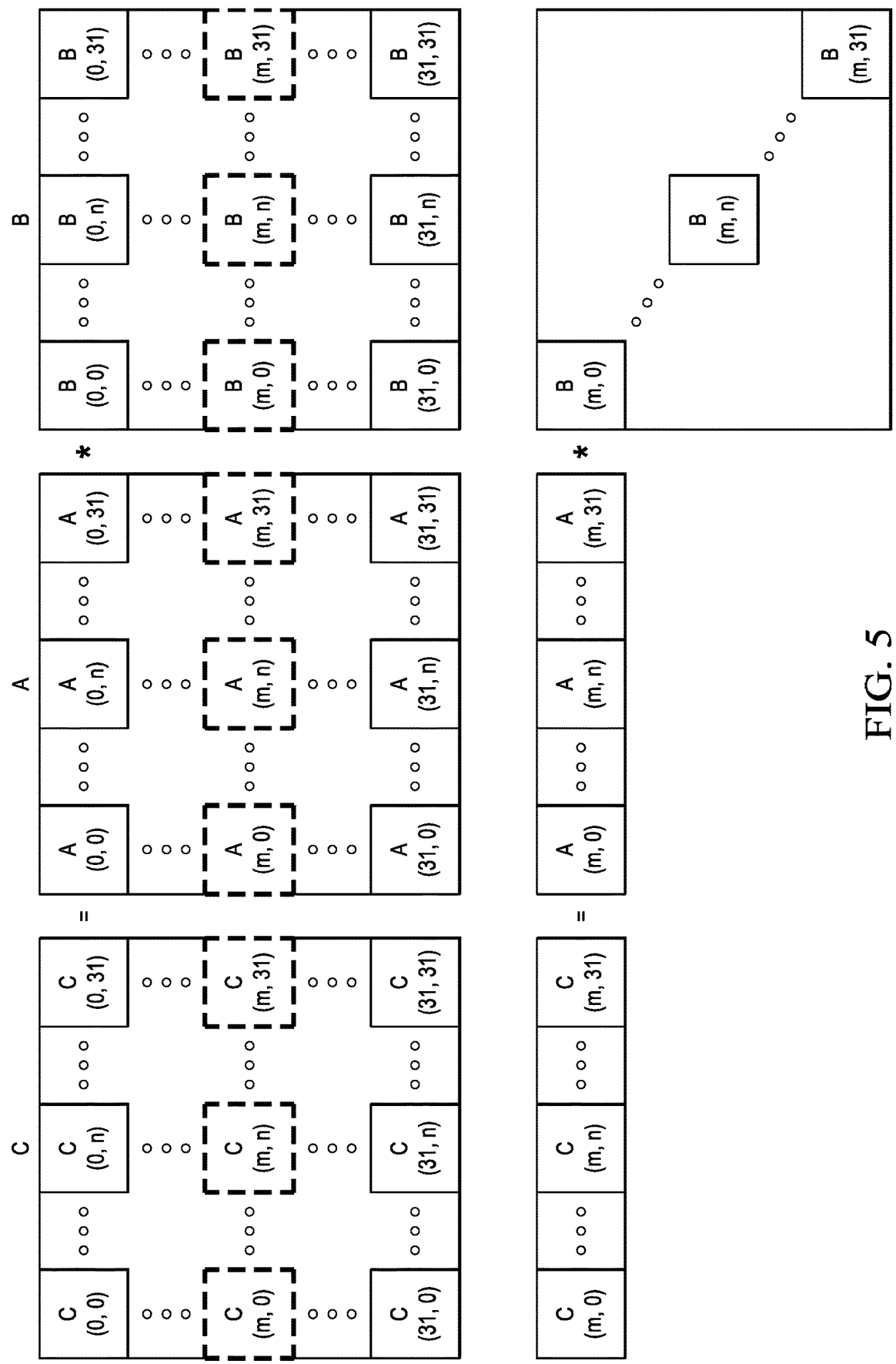
FIG. 5 is an example illustrating implementation of matrix matrix point wise multiplication in the device of FIG. 1.

FIG. 5 is an example illustrating implementation of matrix matrix point wise multiplication C=A.*B in the device 100 of FIG. 1. In matrix matrix point wise multiplication, the dimensions of the matrices A, B, C are the same, e.g., m×n, and an element C(m, n) is the product of A(m, n) and B(m, n). In the device 100, C=A.*B can be implemented as C(k, :)=A(k, :)*diag(B(k, :)), k=0, . . . , 31. That is, the point wise multiplication can be implemented by loading the elements of each row of the B matrix in turn on the diagonal in a B matrix buffer 144 and performing matrix multiplication with the corresponding row of the A matrix loaded in the A matrix buffer 138. The example in FIG. 5 illustrates this for row m of the A matrix and the B matrix, assuming m=n=32.

To perform this primitive, the streaming engine 110 is configured read elements of the B matrix from the L2 cache 106 and to provide each row of the B matrix in turn for loading in a B matrix buffer 144 of the MMA 104. That is, the first vector from the streaming engine 110 will contain the first row, row 0, of the B matrix, the second vector from the streaming engine will contain the second row of the B matrix, etc. The streaming engine 108 is configured to read elements of the A matrix from the L2 cache 106 and to provide each row of the A matrix in turn for loading in the A matrix buffer 138. That is, the first vector from the streaming engine 108 will contain the first row, row 0, of the A matrix, the second vector from the streaming engine will contain the second row of the A matrix, etc.

The row offset component 140 of the MMA 104 is configured to cause the elements of a row of the B matrix to be loaded diagonally in a B matrix buffer 144. That is, the offsets for the row elements are set to sequential values ranging from 0 to 31, such that the first element of a row is loaded in row 0, column 0, the second element is loaded in row 1, column 1, the third element is loaded in row 2, column 2, etc.

To perform the point wise multiplication, appropriately configured LSE instructions are executed on the MMA 104 to load a B matrix buffer 144 with the initial row of the B matrix. Once a B matrix buffer is loaded, further LSE instructions are executed to load the corresponding row of the A matrix in the A matrix buffer 138, perform the matrix multiplication, and store the results in the corresponding row of a C matrix buffer 134. Further, the LSE instructions will also load the next row of the B matrix in the background B matrix buffer 144. This process of loading a row of the B matrix on the diagonal in the background B matrix, executing a matrix multiply on the foreground B matrix buffer, and storing the results is repeated until all rows of the B matrix have been processed. LSE instructions to move the contents of the C matrix buffer 134 out of the MMA 104 are then executed.

Figure 6:
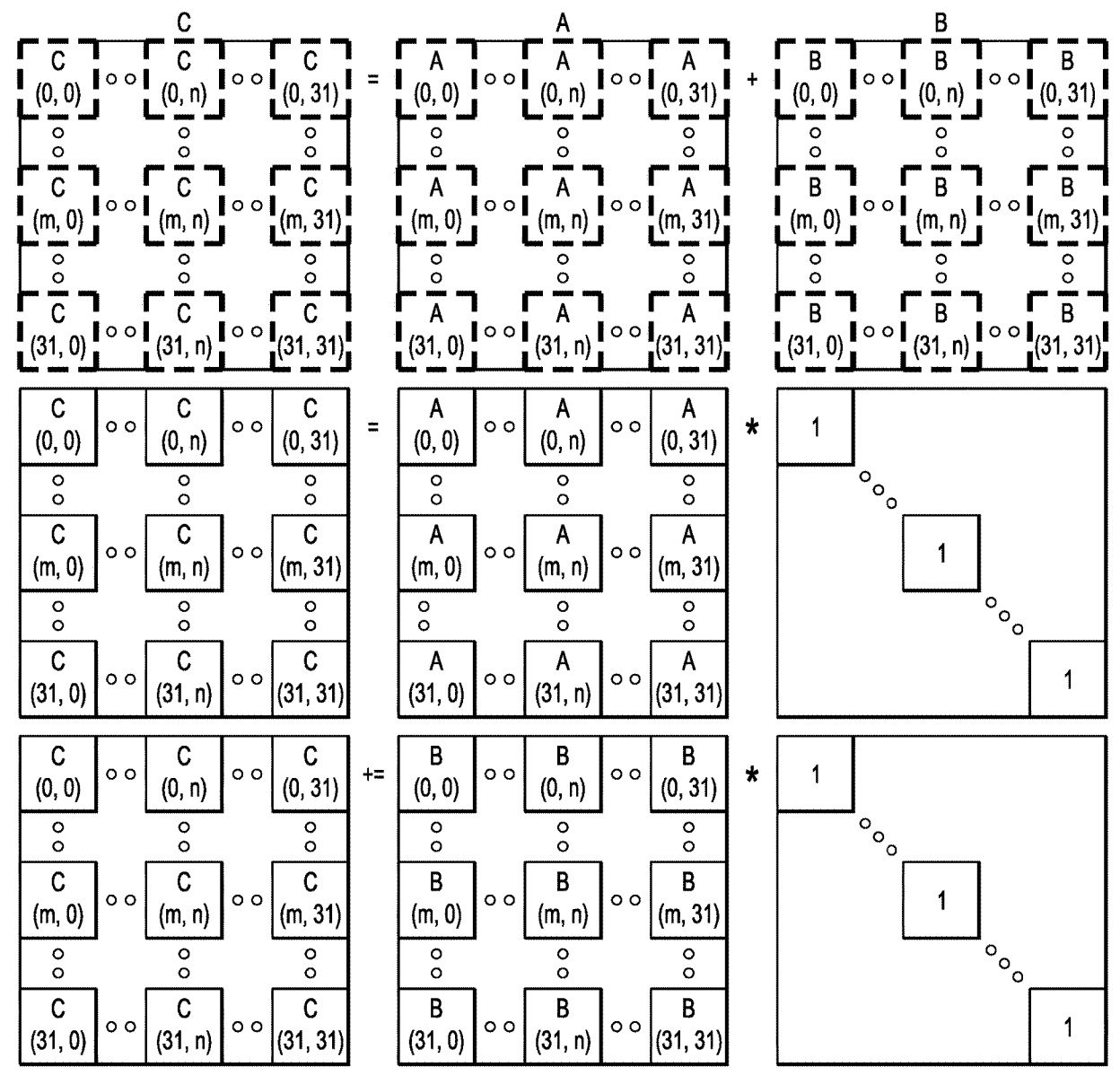

FIG. 6 is an example illustrating implementation of matrix matrix addition C=A+B in the device 100 of FIG. 1. In matrix matrix addition, the dimensions of the matrices A, B, C are the same, e.g., m×m, and an element C(m, n) is the sum of A(m, n) and B(m, n). Using the MMA 104, C=A+B can be implemented as C=A*I+B*I, where I is the identity matrix. More specifically, as shown in FIG. 6, C=A+B can be implemented as C=A*I followed by C+=B*I. Note that C=A+B can also be implemented as C=B*I followed by C+=A*I. The identity matrix is a square matrix in which all the elements of the principal diagonal are ones and all other elements are zeros. The effect of multiplying a given matrix by an identity matrix is to leave the given matrix unchanged.

To perform this primitive, the streaming engine 108 is configured to read elements of A from the L2 cache 106 and to provide each row of A in turn to be loaded into the A matrix buffer 138. The input formatting 122 is configured to generate vectors of the identity matrix I to be loaded in to a B matrix buffer 144. Appropriately configured LSE instructions are executed in the MMA 104 to load each row of A in the A matrix buffer 138, perform the matrix multiplication between the row of A loaded in the A matrix buffer 138 and the identity matrix in a B matrix buffer 144, and store the results in corresponding locations of a C matrix buffer 134. The =operation is specified in the LSE instructions for storing the results in the C matrix buffer. Thus, each element of A is stored unchanged in a corresponding location in the C matrix buffer.

The streaming engine 108 is then configured to read elements of B from the L2 cache 106 and to provide each row of B in turn to be loaded into the A matrix buffer 138. Appropriately configured LSE instructions are executed in the MMA 104 to load each row of B in the A matrix buffer 138, perform the matrix multiplication between the row of B loaded in the A matrix buffer 138 and the identity matrix in a B matrix buffer 144, and store the results in corresponding locations of the C matrix buffer 134 storing the result of A*I. The += operation is specified in the LSE instructions for storing the results in the C matrix buffer, thus causing the value of each data element of B to be added to the value of a corresponding element of A stored in the corresponding location of the C matrix buffer. LSE instructions to move the contents of the C matrix buffer 134 out of the MMA are then executed.

Figure 7:
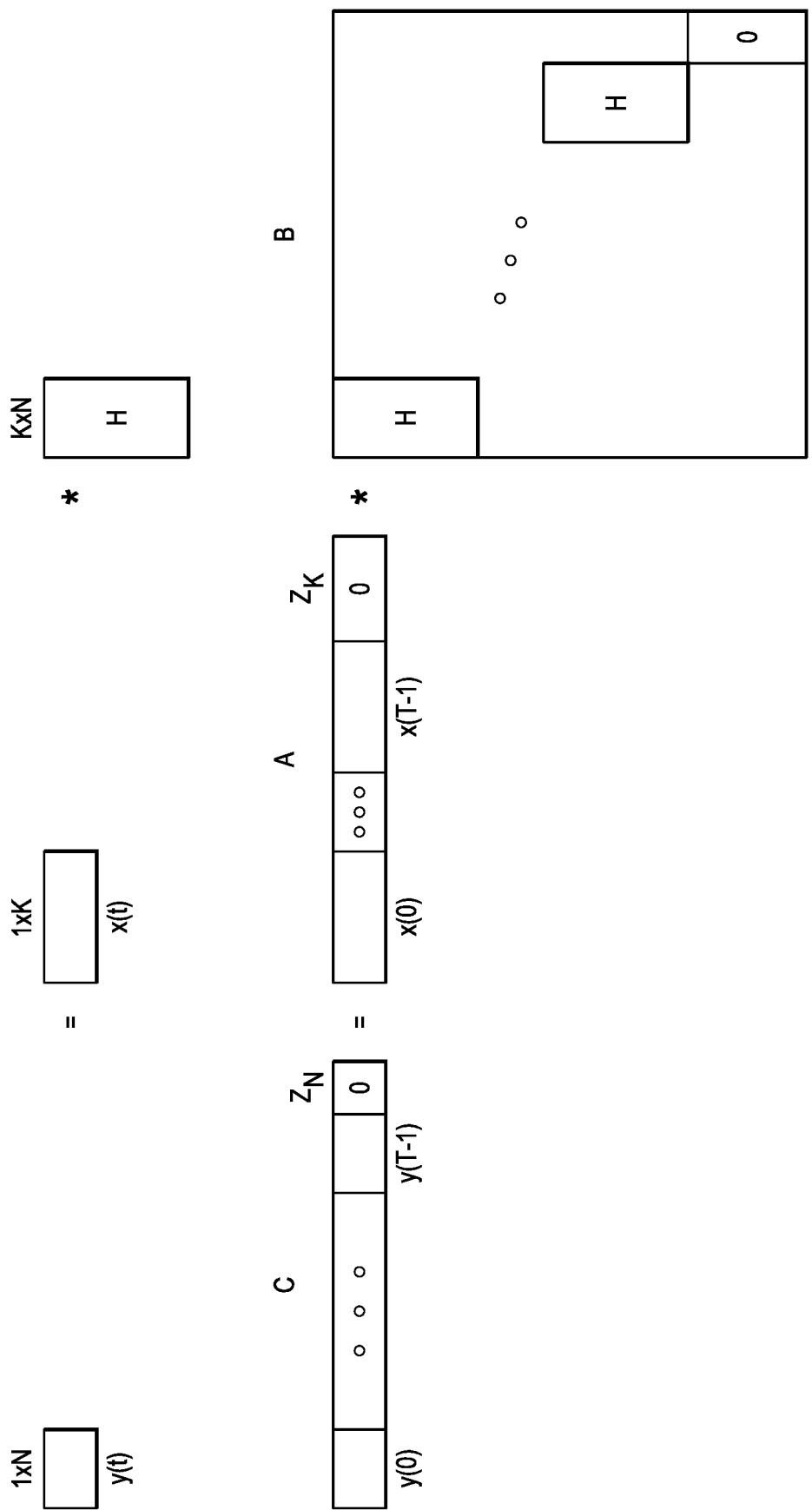
FIG. 7 is an example illustrating implementation of small vector matrix multiplication in the device of FIG. 1.

FIG. 7 is an example illustrating implementation of small vector matrix multiplication y=x*H in the device 100 of FIG. 1. For a constant matrix H, multiplication by multiple x vectors can be computed in a single batch by loading multiple copies of H block diagonally in a B matrix buffer 144, loading the corresponding x vectors in the A matrix buffer 138, and performing a matrix multiply. As shown in FIG. 7, assume H is a K×N matrix and each x vector is 1×K. The batch size T, i.e., the number of copies of H that can be loaded into a B matrix buffer 144 block diagonally, is T=floor(32/max(K,N)). Thus, T copies of H can be loaded block diagonally into a B matrix buffer 144 and corresponding vectors x(t), t=0, 1, . . . , T−1, can be loaded in the A matrix buffer 138.

To perform this primitive, the streaming engine 108 is configured to read elements of T corresponding x vectors from the L2 cache 106 and to provide vectors for loading in the A matrix buffer 138. That is, the vectors from the streaming engine 108 contain the elements of x(0), . . . x(T−1). The loading of the vectors via the streaming engine 108 is similar to that described in reference to FIG. 3, where M=1. The streaming engine 110 is configured to read the elements of the H matrix from the L2 cache 106 and provide vectors for loading in a B matrix buffer 144 of the MMA 104 that contain elements of successive rows of the H matrix. To replicate the H matrix, multiple copies of the rows of the H matrix with appropriate zero padding are stored contiguously in the L2 cache 106. Alternatively, either the input formatting 122 or the streaming engine 110 is configured to replicate each row of H T times and add the appropriate zero padding.

The row offset component 140 of the MMA 104 is configured to cause the elements of the rows in each vector from the streaming engine 110 to be loaded at an offset t*K in a B matrix buffer 144. Thus, the elements of replicated row 0 of the H matrix are loaded with an offset of 0, the elements of replicated row 1 of the H matrix are loaded with an offset of K, the elements of replicated row 2 of the H matrix are loaded with an offset of 2K, etc.

To perform the multiplication, appropriately configured LSE instructions are executed on the MMA 104 to load a B matrix buffer 144 with an initial batch of replicated H matrices. Once a B matrix buffer is loaded, further LSE instructions are executed to load the vector of corresponding x vectors in the A matrix buffer 138, perform the multiplication, and store the results in a C matrix buffer 134. Further, if multiple batches are to be processed, appropriately configured LSE instructions will load another vector in the A matrix buffer 138, perform the multiplication, and store the previously computed vector. Note that the B matrix buffer 144 does not need to be reloaded for each new vector loaded in the A matrix buffer 138.

Figure 8:
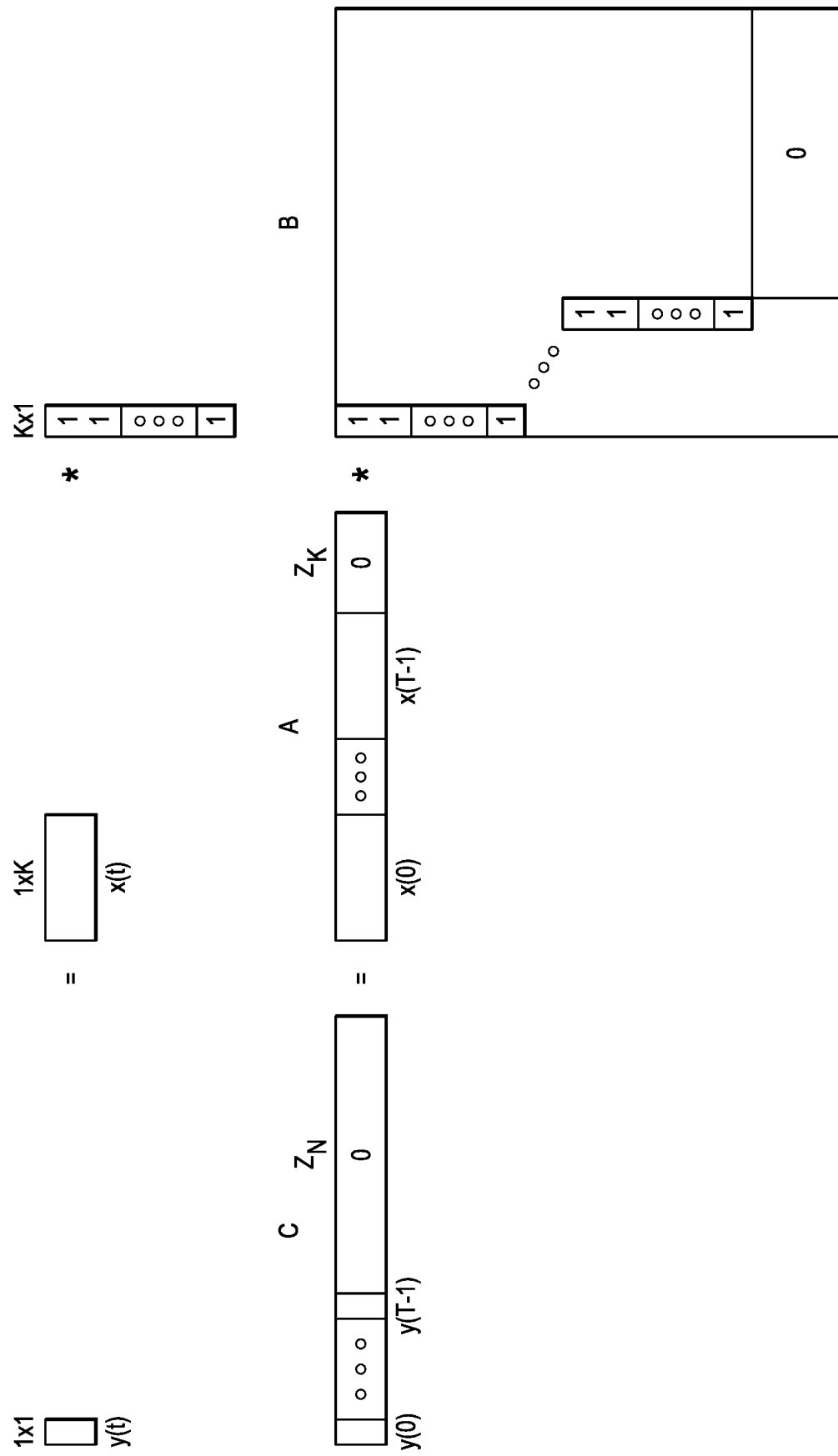
FIG. 8 is an example illustrating implementation of small vector summation in the device of FIG. 1.

FIG. 8 is an example illustrating implementation of small vector summation in the device 100. Vector summation may be expressed as y=sum(x) where y is the sum of the elements of the vector. For sufficiently small vectors, multiple summation can be computed in a single batch by loading multiple x vectors in the A matrix buffer 144, loading copies of a vector of ones on the diagonal in a B matrix buffer 144, and performing a matrix multiply. As shown in FIG. 8, assume each x vector is 1×K. The batch size T, i.e., the number of vectors that can be loaded into the A matrix buffer 138, is T=floor(32/K). Thus, x(t), t=0, 1, . . . , T−1, can be loaded in the A matrix buffer 138 and T copies of a K×1 vector of all ones should be loaded in a B matrix buffer 144.

To perform this primitive, the streaming engine 108 is configured to read element of x vectors from the L2 cache 106 and provide vectors for loading in the A matrix buffer 138 that contain T x vectors. That is, the vectors from the streaming engine 108 contains the vectors x(0), . . . x(T−1). The loading of the vectors via the streaming engine 108 is similar to that described in reference to FIG. 3, where M=1. Further, the input formatting 122 is configured to generate the K×1 vectors of all ones to be loaded on the diagonal in a B matrix buffer 144.

To perform the summations, appropriately configured LSE instructions are executed on the MMA 104 to load a B matrix buffer 144 on the diagonal with multiple copies of a 1×K vector of all ones. Once a B matrix buffer is loaded, further LSE instructions are executed to load the x(0) . . . x(T−1) vectors in the A matrix buffer 138, perform the multiplication, and store the results in a row of a C matrix buffer 134. Further, if multiple batches are to be processed, appropriately configured LSE instructions will load another vector in the A matrix buffer 138, perform the multiplication, and store the previously computed vector. Note that the B matrix buffer 144 does not need to be reloaded for each new vector loaded in the A matrix buffer 138.

Figure 9:
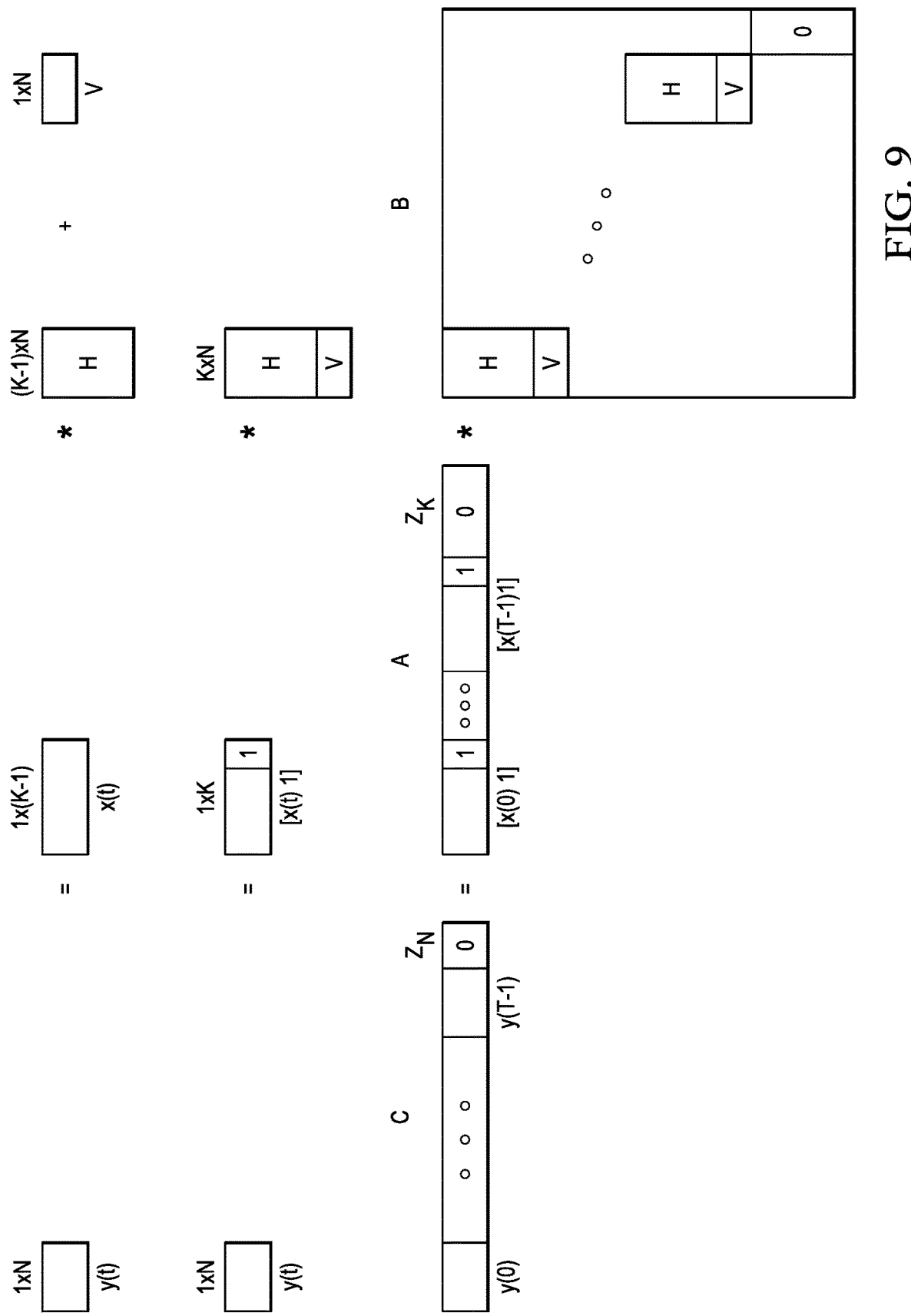
FIG. 9 is an example illustrating implementation of affine transformation in the device of FIG. 1.

FIG. 9 is an example illustrating implementation of affine transformation in the device 100. Affine transformation may be expressed as y=x*H+v and can be computed as y=[x 1]*[H;v]. If the matrix H and the vector v are constant over multiple transformations, the affine transformations can be computed in batches by loading multiple copies of [H;v] block diagonally in a B matrix buffer 144, loading the corresponding x vectors in the A matrix buffer 138, and performing a matrix multiply. As shown in FIG. 9, assume H is a (K−1)×N matrix, v is 1×N, and each x vector is 1×(K−1). The batch size T, i.e., the number of copies of [H;v] that can be loaded into a B matrix buffer 144 block diagonally, is T=floor(32/max(K,N)). Thus, T copies of [H;v] can be loaded block diagonally into a B matrix buffer 144 and corresponding vectors x(t), t=0, 1, . . . , T−1, can be loaded in the A matrix buffer 138.

To perform this primitive, the streaming engine 110 is configured to read elements of the H matrix and v from the L2 cache 106 and provide vectors for loading in a B matrix buffer 144 of the MMA 104. To replicate the H matrix concatenated with v, K−1 rows of H are stored contiguously in the L2 cache 106 followed by one row of v and the input formatting 122 is configured to replicate this T times and add Zn zeros. Alternatively, T copies of each row of H are stored contiguously in the L2 cache 106 each followed by Zn zeros, then T copies of v are stored contiguously in the L2 cache 106 followed by Zn zeros.

The streaming engine 108 is configured to read elements of T corresponding x vectors from the L2 cache 106 and provide vectors for loading in the A matrix buffer 138. In one example, T copies of x(t) are stored contiguously in the L2 cache 106, and the input formatting 122 is configured to add a one between copies and Zk zeros at the end. Alternatively, T copies of x(t) are stored contiguously in the L2 cache 106 with a one between copies and Zk zeros at the end.

The row offset component 140 of the MMA 104 is configured to cause elements in each vector from the streaming engine 110 to be loaded at appropriate offsets in a B matrix buffer 144. For example, assuming that T copies of each row of H are stored contiguously in the L2 cache 106 each followed by Zn zeros, then T copies of v are stored contiguously in the L2 cache 106 followed by Zn zeros, the row offset component 140 is configured such that elements of replicated row 0 of the [H;v] matrix are loaded with an offset of 0, the elements of replicated row 1 of the [H;v] matrix are loaded with an offset of K, the elements of replicated row 2 of the [H;v] matrix are loaded with an offset of 2K, etc.

To perform the multiplication, appropriately configured LSE instructions are executed on the MMA 104 to load a B matrix buffer 144 with an initial batch of replicated [H;v] matrices. Once a B matrix buffer is loaded, further LSE instructions are executed to load the vector of corresponding x vectors in the A matrix buffer 138, perform the multiplication, and store the results in a C matrix buffer 134. Further, if multiple batches are to be processed, appropriately configured LSE instructions will load another vector in the A matrix buffer 138, perform the multiplication, and store the previously computed vector. Note that the B matrix buffer 144 does not need to be reloaded for each new vector loaded in the A matrix buffer 138.

Figure 10:
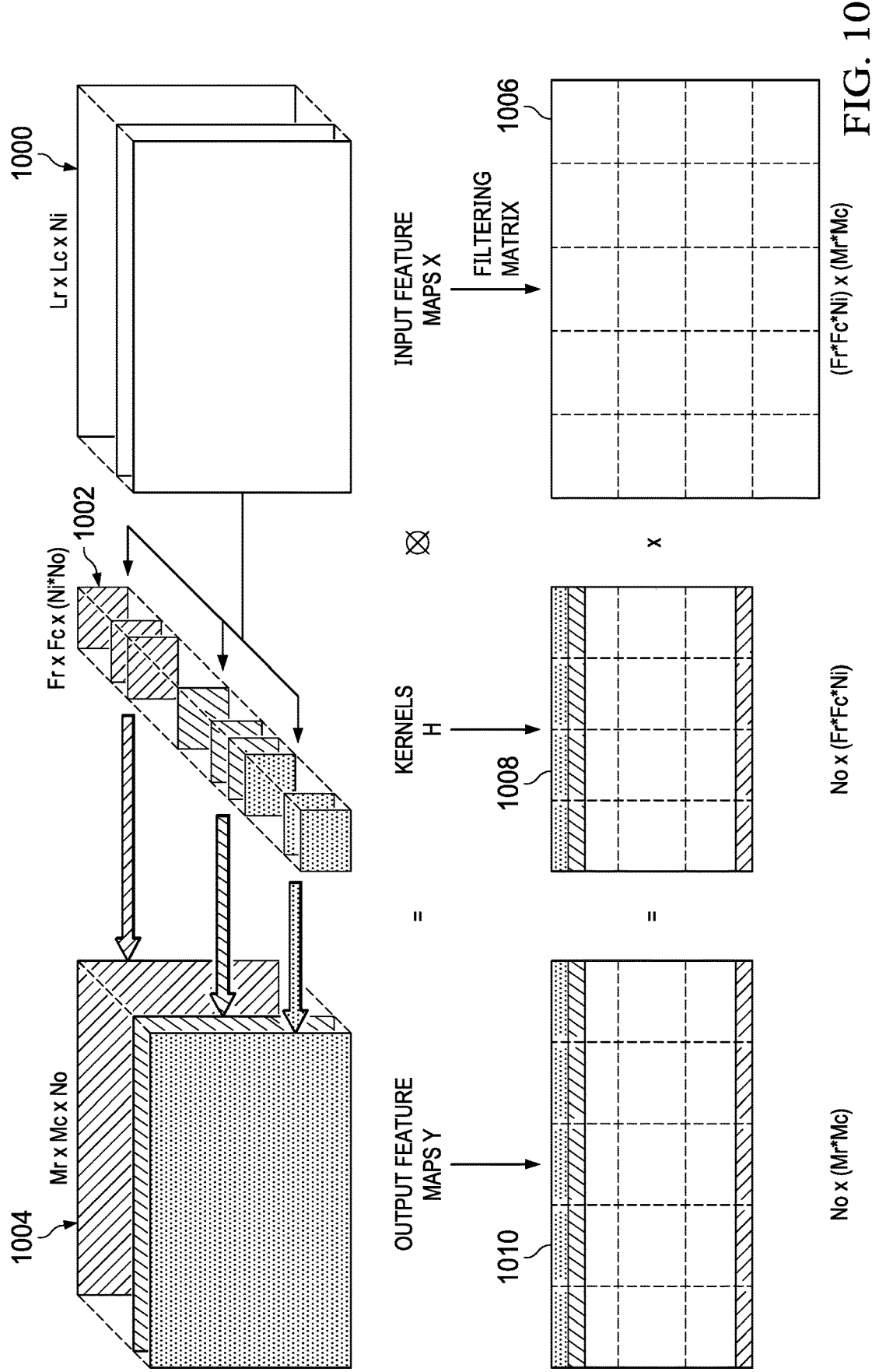
FIGS. 10 and 11 are examples illustrating implementation of two-dimensional (2D) convolution in the device of FIG. 1.

FIG. 10 is an example illustrating implementation of two-dimensional (2D) convolution Y=H⊙X as used in a convolutional neural network (CNN) in the device 100. A typical convolutional neural network (CNN) includes some number of convolutional and subsampling layers to extract features followed by one or more fully connected layers as used in traditional neural networks to perform classification based on the extracted features. The output of each convolution layer and each subsampling layer is a set of feature maps which are the input to the next layer in the CNN. Each convolution layer includes some number of filters, the size and number of which may be different for each layer. The filters are convolved with corresponding feature maps to produce a feature map corresponding to each filter.

FIG. 10 shows a generic convolution layer having Ni input feature maps 1000 with dimensions Lr×Lc. The input feature maps 1000 are convolved with corresponding filters 1002 with dimensions Fr×Fc to generate No output feature maps 1004 with dimensions Mr×Mc. To perform the 2D convolution using the MMA 104, the feature maps 1000 are tiled into a filtering matrix X 1006 of dimensions (Fr*Fc*Ni)×(Mr*Mc). The tile size in the filtering matrix X can be large or small with a tile overlap selected as a function of the filter length. The overlap is present because convolution generates M=L−F+1 outputs for an input size of L and filter length of F. Choosing a large size for the tiles in the filtering matrix X 1106 can avoid seams while for a small tile size, the tile processing puts the seam in the same place for removal by the processor 102. Large feature map tiles satisfy Lc=32*Bc+Fc−1 and small feature map tiles satisfy Lc<=(32+Fc−1)/Bc. This choice of tile size puts the seam in the same place.

Figure 11:
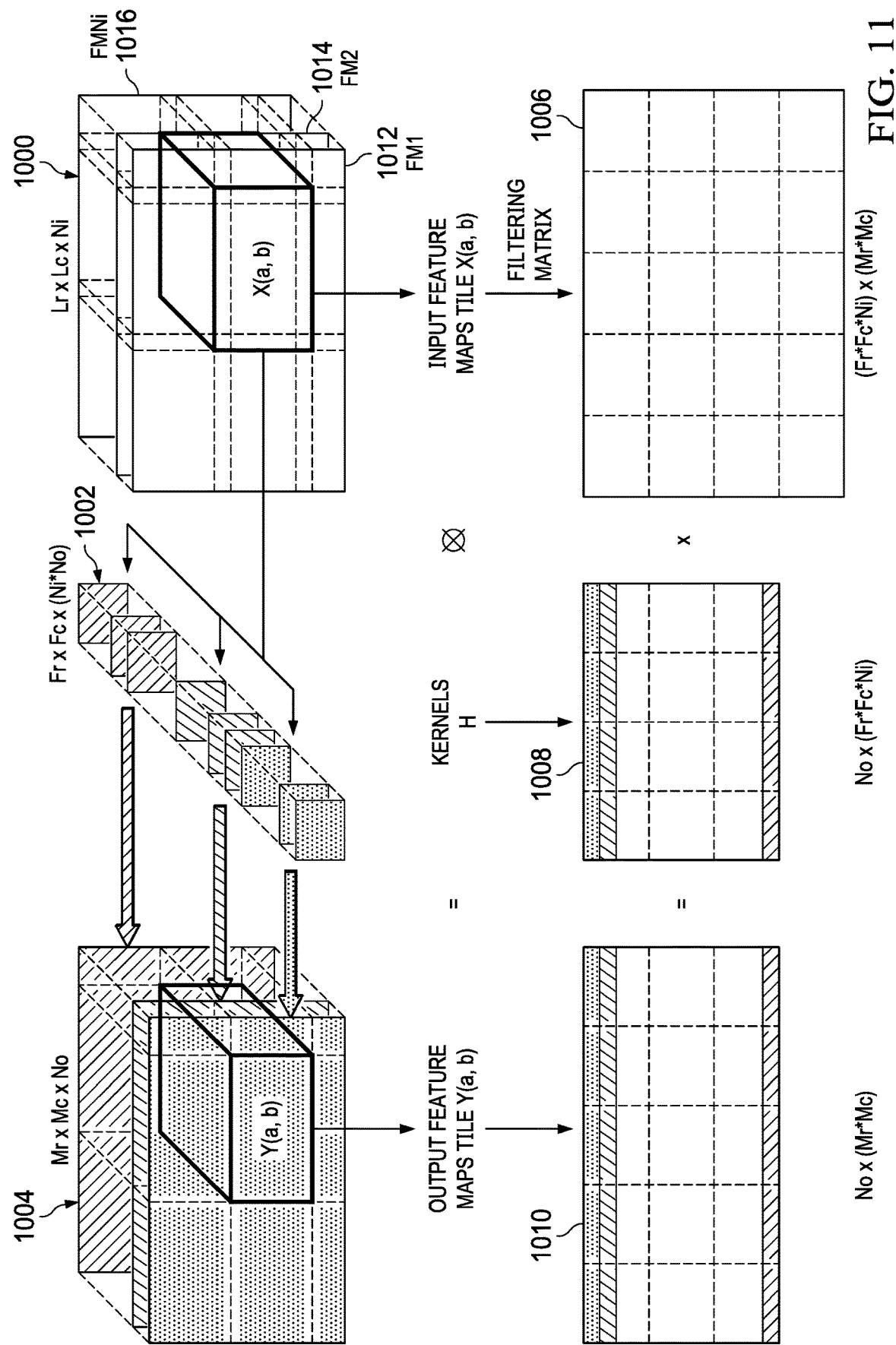

To compute the output feature maps 1004, the filters or kernels can be read in contiguous 32×32 blocks, applied to 32×32 blocks of the tile filtering matrix X 1006 in the MMA 104, and the results of applying the filters to the input feature maps 1000 can be computed separately by the MMA 104 for 32×32 blocks of the tile filtering matrix 1006 and combined to generate the output feature maps 1004. The rows of the filters or kernels 1002 can be stored in the L2 cache 106 consecutively and the filter matrix H 1008 can be read from the L2 cache 106 in contiguous 32×32 blocks. As illustrated in FIG. 11, the feature map tiles of the tile filtering matrix 1006 are read in cubes, i.e., all the rows of a tile of the initial feature map FM1 1012 are read, following by all the rows of the corresponding tile in the next feature map FM2 1014, etc., through all the rows of the corresponding tile in the last feature map FMNi 1016. The computation can be performed in block column order as per $$Y(:, n) = H * Xfilter(:, n), n = 0, \ldots, N-1$$

or in block row order (shown in this example) as per $$Y(m, :) = H(m, :) * Xfilter, m = 0, \ldots, M-1$$

where Xfilter is the tile filtering matrix.

To perform this primitive when large feature map tiles are used, the streaming engine 108 is configured to read filter vectors of the filter matrix H 1008 from the L2 cache 106 in block row order for loading in the A matrix buffer 138 of the MMA 104. The streaming engine 110 is configured to read elements of row of feature maps form the L2 cache 106 and to provide each row in turn of 32×32 tiles in the feature maps for loading in a B matrix buffer 144 of the MMA 104. Table 3 is an example of pseudo code for configuring the streaming engine 108 and Table 4 is an example of pseudo code for configuring the streaming engine 110. In this pseudo code, Bf is the number of bytes per feature map data element, S is the stride, VECLEN is the vector length, and the tile size is Lr×Lc×Ni where Lc=32*Bc+Fc−1 and Be is a positive integer indicating the number of valid input feature map tile columns. The value of Be can be chosen, for example, as the largest possible integer such that 32*Bc+Fc−1≤the number of columns in the feature map. Smaller values of Bc can also be used.

In the pseudo code of Table 3, the values of ICNTx and DIMx are chosen such that the filter matrix H is generated in block row order as previously specified. The rows of the H matrix are either stored with a zero pad in the L2 cache 106 or the streaming engine 108 or the input formatting 122 is configured to add the zero padding. In the pseudo code of Table 3, the values of ICNTx and DIMs are chosen such that the filtering matrix X is generated in block column order as previously specified. The for loop indicates that the whole pattern repeats ceil(No/32) times.

The pattern in the pseudo code of Table 3 and Table 4 creates a large matrix matrix multiplication problem, i.e., from the perspective of the MMA 104, the processing performed is a large matrix matrix multiplication problem that is performed as previously described in reference to FIG. 4.

TABLE 3

```
// generate H in block row order
// block row repeats = block cols of Xfilter
VECLEN     = 32*Bf
ELEM_BYTES = Bf
ICNT0      = 32
ICNT1      = 32
DIM1       = Bf*Fr*Fc*Ni
ICNT2      = ceil(Fr*Fc*Ni/32) // zero pad Fr*Fc*Ni to mult of 32
DIM2       = 32*Bf
ICNT3      = Bc*ceil((Lr − Fr +1)/S) // this is the block
DIM3       = 0       // row repeat
ICNT4      = ceil(No/32)
DIM4       = 32*Bf*Fr*Fc*Ni
ICNT5      = not used
DIM5       = not used
```

TABLE 4

```
// generate filtering matrix X in block column order
// 1x for each block row of H
for (r = 0; r < ceil(No/32); r++) {
    VECLEN     = 32*Bf
    ELEM_BYTES = Bf
    ICNT0      = 32
    ICNT1      = Fc
    DIM1       = Bf
    ICNT2      = Fr
    DIM2       = Bf*Lc
    ICNT3      = Ni
    DIM3       = Bf*Lr*Lc
    ICNT4      = Bc
    DIM4       = 32*Bf
    ICNT5      = ceil((Lr − Fr + 1)/S)
    DIM5       = Bf*S*Lc}
```

To perform this primitive when small feature map tiles are used, the streaming engine 108 is configured to read filter vectors of the filter matrix H 1008 in block row order from the L2 cache 106 for loading in the A matrix buffer 138 of the MMA 104. The streaming engine 110 is configured to read elements of feature maps from the L2 cache 106 and to provide each row in turn of 32×32 tiles in the feature maps for loading in a B matrix buffer 144 of the MMA 104. Table 5 is an example of pseudo code for configuring the streaming engine 108 and Table 6 is an example of pseudo code for configuring the streaming engine 110. In this pseudo code, Bf is the number of bytes per feature map data element, S is the stride, VECLEN is the vector length, the tile size is Lr×Lc×Ni where Tc≤(32+Fc−1)/Bc and Be is a positive integer indicating the number of valid input feature map tile columns, and M=max(Bc, S). The value of Be is the maximum integer that satisfies Bc≤(32+Fc−1)/Lc.

In the pseudo code of Table 5, the values of ICNTx and DIMx are chosen such that the filter matrix H is generated in block row order as previously specified. The rows of the H matrix are either stored with a zero pad in the L2 cache 106 or the streaming engine 108 or the input formatting 122 is configured to add the zero padding. In the pseudo code of Table 6, the values of ICNTx and DIMs are chosen such that the filtering matrix X is generated in block column order as previously specified. The for loop indicates that the whole pattern repeats ceil(No/32) times.

The pattern in the pseudo code of Table 5 and Table 6 creates a large matrix matrix multiplication problem, i.e., from the perspective of the MMA 104, the processing performed is a large matrix matrix multiplication problem that is performed as previously described in reference to FIG. 4.

TABLE 5

```
// generate H in block row order
// block row repeats = block cols of Xfilter
VECLEN     = 32*Bf
ELEM_BYTES = Bf
ICNT0      = 32
ICNT1      = 32
DIM1       = Bf*Fr*Fc*Ni
ICNT2      = ceil(Fr*Fc*Ni/32) // zero pad Fr*Fc*Ni to mult of 32
DIM2       = 32*Bf
ICNT3      = ceil((Lr − Fr + 1)/M) // this is the block
DIM3       = 0        // row repeat
ICNT4      = ceil(No/32)
DIM4       = 32*Bf*Fr*Fc*Ni
ICNT5      = not used
DIM5       = not used
```

TABLE 6

```
// generate filtering matix X in block column order
// 1x for each block row of H
for (r = 0; r < ceil(No/32); r++) {
    VECLEN     = (Bc*Lc − Fc + 1)*Bf
    ELEM_BYTES = Bf
    ICNT0      = Bc*Lc − Fc +1
    ICNT1      = Fc
    DIM1       = Bf
    ICNT2      = Fr
    DIM2       = Bf*Lc
    ICNT3      = Ni
    DIM3       = Bf*Lr*Lc
    ICNT4      = ceil((Lr − Fr + 1)/M)
    DIM4       = Bf*M*Lc
    ICNT5      = not used
    DIM5       = not used}
```

When large feature tiles are used, if the stride S is greater than one, the configuration of the streaming engine 108 handles the row stride. The column stride is handled by configuring the output formatting 116 to write out one of every S columns generated by the MMA 104. When small feature tiles are used, seams need to be removed from the output of the MMA 104. If no stride S is specified, then the output formatting 116 is configured to remove Bc−1 seams of size Fc−1 from the output and to remove the last 32−Bc*Lc+Fc−1 samples from the output and ignore the end samples if (Lr−Fr+1)/Bc is not an integer. If a stride S is specified, the output formatting 116 is configured to perform seam removal on the output and to remove (S−1)/S rows and columns from the output. In some examples, when zero padding is needed for the next convolution layer, the output formatting 116 is configured to add the zero padding to the output of the MMA 104.

Figure 12:
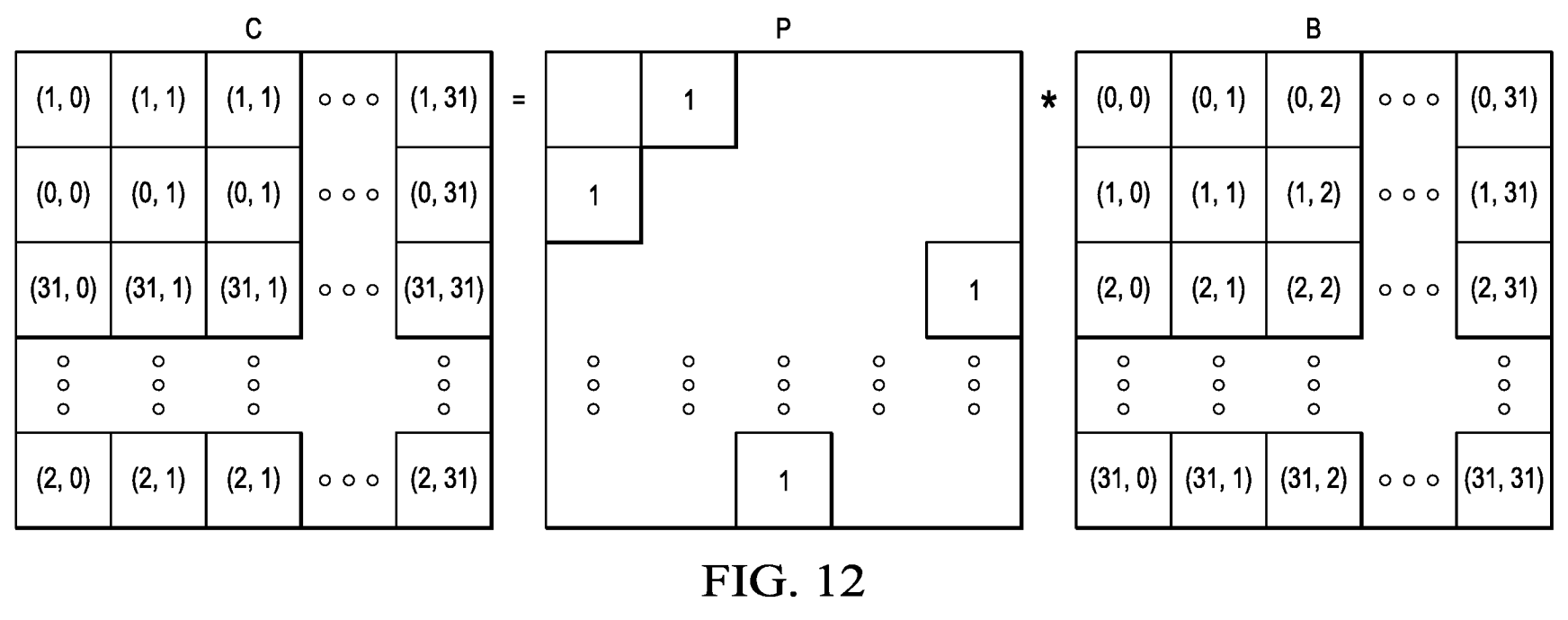

FIG. 12 is an example illustrating implementation of matrix row permutation, C=B(new index, :)) in the device 100 of FIG. 1. Row permutation can be implemented as C=P*B where a permutation matrix P has a single one in each row and column, the column locations of which are the new row indices for corresponding elements of B. All other elements in P are set to zero.

To perform this primitive, the streaming engine 110 is configured to provide each row of the B matrix in turn from the L2 cache 106 for loading in a B matrix buffer 144 of the MMA 104. That is, the first vector from the streaming engine 110 will contain the first row, row 0, of the B matrix, the second vector from the streaming engine 110 will contain the second row of the B matrix, etc. The streaming engine 108 is configured to provide each row of the P matrix in turn from the L2 cache 106 for loading in the A matrix buffer 138. That is, the first vector from the streaming engine 108 will contain the first row, row 0, of the P matrix, the second vector from the streaming engine will contain the second row of the A matrix, etc.

To perform the row permutation, appropriately configured LSE instructions are executed on the MMA 104 to load a B matrix buffer 144 with the B matrix. Once a B matrix buffer is loaded, further LSE instructions are executed to load rows of the P matrix in the A matrix buffer 138, perform the matrix multiplications, and store the results in corresponding rows of a C matrix buffer 134. LSE instructions to move the contents of the C matrix buffer 134 out of the MMA 104 are executed once all matrix multiplications have been completed.

Figure 13:
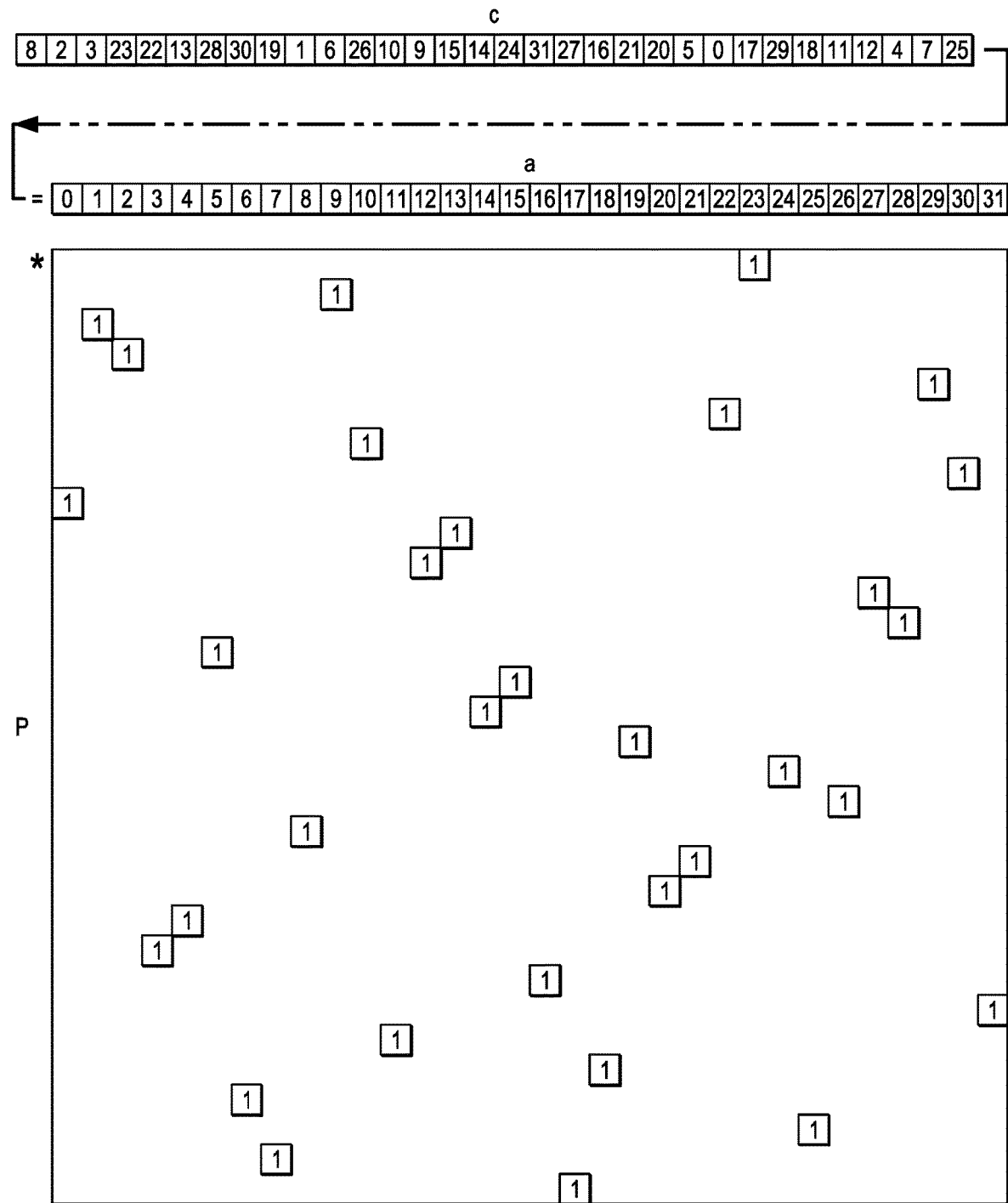
FIG. 13 is an example illustrating implementation of vector column permutation, in the device of FIG. 1.

FIG. 13 is an example illustrating implementation of vector column permutation, c(k,:)=a(k, new index)) in the system of FIG. 1. Vector column permutation can be implemented as c(k,:)=a(k, :)*P where a permutation matrix P has a single one in each row and column, the row locations of which are the new column indices for the elements of a. All other elements in P are set to zero.

To perform this primitive, the streaming engine 110 is configured to provide each row of the P matrix in turn from the L2 cache 106 for loading in a B matrix buffer 144 of the MMA 104. That is, the first vector from the streaming engine 110 will contain the first row, row 0, of the P matrix, the second vector from the streaming engine will contain the second row of the P matrix, etc. The streaming engine 108 is configured to provide the vector c from the L2 cache 106 for loading in the A matrix buffer 138.

To perform the column permutation, appropriately configured LSE instructions are executed on the MMA 104 to load a B matrix buffer 144 with the P matrix. Once a B matrix buffer is loaded, further LSE instructions are executed to load the c vector in the A matrix buffer 138, perform the matrix multiplications, and store the results in a corresponding row of a C matrix buffer 134. LSE instructions to move the contents of the C matrix buffer 134 out of the MMA 104 are executed once all matrix multiplications have been completed.

The device 100 can also be configured to perform batch small one-dimensional (1D) complex to complex fast Fourier transforms (FFTs) with interleaved real and imaginary parts and with separate real and imaginary parts and large 1D complex to complex FFTs with interleaved real and imaginary parts and with separate real and imaginary parts. In the following FFT descriptions, the subscript "co" denotes complex, the subscript "re" denotes real, and the subscript "im" denotes imaginary.

A small complex to complex FFT of length N≤16 with interleaved real and imaginary parts can be computed as a brute force discrete Fourier transform (DFT) as per $$y_{co}^N = x_{co}^N * F_{co}^N$$

where $$x_{co}^N = [x_{re}(0)\ x_{im}(0)\ ...\ x_{re}(N-1)\ x_{im}(N-1)]$$
$$y_{co}^N = [y_{re}(0)y_{im}(0)...y_{re}(N-1)\ y_{im}(N-1)]$$
$$F_{co}^N = [F_{re}^N(0,0)F_{im}^N(0,0)\ ...\ F_{re}^N(0,N-1)\ F_{im}^N(0,N-1)]$$
$$[-F_{im}^N(0,0)\ F_{re}^N(0,0)\ ...\ -F_{im}^N(0,N-1)\ F_{re}^N(0,N-1)]$$
$$[...\ ...\ ...\ ...]$$
$$[F_{re}^N(N-1,0)\ F_{im}^N(N-1,0)\ ...\ F_{re}^N(N-1,N-1)F_{im}^N(N-1,N-1)]$$
$$[-F_{im}^N(N-1,0)F_{re}^N(N-1,0)\ ...\ -F_{im}^N(N-1,N-1)\ F_{re}^N(N-1,N-1)]$$
$$F^N(r,c) = e^{-j*(2*\pi/N)*r*c}.$$

As used herein, a brute force DFT is using a DFT matrix to multiply an input vector to create an output vector that is the DFT of the input.

For N=16, vector matrix multiplication can be used to compute $y_{co}^{16} = x_{co}^{16} * F_{co}^{16}$ as $x_{co}^{16}$ and $y_{co}^{16}$ are 1×32 vectors with interleaved real and imaginary values and $F_{co}^{16}$ is a 32×32 matrix. That is, a vector $x_{co}^{16}$ can be loaded into the A matrix buffer 138 of the MMA 104 and the matrix $F_{co}^{16}$ can be loaded in a B matrix buffer 144, the matrix product computed, and the results stored in a C matrix buffer 134. For smaller values of N, small vector matrix multiplication as previously described herein in reference to FIG. 7 can be used to compute batches of brute force DFTs.

Batches of small complex to complex FFTs with separate real and imaginary parts can be computed as brute force discrete Fourier transforms (DFT) as per $$Y_{re}^{M,N} = X_{re}^{M,N} * F_{re}^N - X_{im}^{M,N} * F_{im}^N$$
$$Y_{im}^{M,N} = X_{im}^{M,N} * F_{re}^N - X_{re}^{M,N} * F_{im}^N$$

where $$X_{re}^{M,N} = [x_{re}^{0,N}]$$
$$[\ ...\ ]$$
$$[x_{re}^{M-1,N}]$$
$$X_{im}^{M,N} = [x_{im}^{0,N}]$$
$$[\ ...\ ]$$
$$[x_{im}^{M-1,N}]$$
$$Y_{re}^{M,N} = [y_{re}^{0,N}]$$
$$[\ ...\ ]$$
$$[y_{re}^{M-1,N}]$$
$$Y_{im}^{M,N} = [y_{im}^{0,N}]$$
$$[\ ...\ ]$$
$$[y_{im}^{M-1,N}]$$
$$[F_{re}^N = [F_{re}^N(0,0)\ ...\ F_{re}^N(0,N-1)]$$
$$[\ ...\ ...\ ]$$
$$[F_{re}^N(N-1,0)\ ...\ F_{re}^N(N-1,N-1)]$$
$$F_{im}^N = [F_{im}^N(0,0)\ ...\ F_{im}^N(0,N-1)]$$
$$[\ ...\ ...\ ]$$
$$[F_{im}^N(N-1,0)\ ...\ F_{im}^N(N-1,N-1)]$$

where $$x_{re}^{m,N} = [x_{re}^{m,N}(0)\ ...\ x_{re}^{m,N}(N-1)]$$
$$x_{im}^{m,N}[x_{im}^{m,N}(0)\ ...\ x_{im}^{m,N}(N-1)]$$
$$y_{re}^N = [y_{re}^N(0)\ ...\ y_{re}^N(N-1)].$$

Batches of M 32-point complex to complex FFTs with separate real and imaginary parts can be computed in the device 100 using matrix matrix multiplication by splitting the computation of $Y_{re}^{M,32}$ and $Y_{im}^{M,32}$ into two computations as per $$Y_{re}^{M,32} = X_{re}^{M,32} * F_{re}^{32}$$
$$Y_{re}^{M,32} -= X_{im}^{M,32} * F_{im}^{32}$$
$$Y_{im}^{M,32} = X_{im}^{M,32} * F_{re}^{32}$$
$$Y_{im}^{M,32} += X_{re}^{M,32} * F_{im}^{32}$$

To perform these computations, the streaming engines 108, 110 and the MMA 104 are configured for matrix matrix multiplication. Further, the input formatting 122 is configured to split the inputs into the real and imaginary parts.

Smaller complex to complex FFTs with separate real and imaginary parts can be computed in the device 100 in batches of batches using the above formulation and batch small matrix matrix multiplication as previously described herein where N=K=FFT size≤32.

A large complex to complex 1D FFT can be computed as follows: 1) load the data X in contiguous order in rows of a matrix; 2) FFT the columns of the matrix; 3) point wise multiply the matrix by the twiddle factors $e^{j*(2*\pi/N)*row*col}$ for IFFT or $e^{-j*(2*\pi/N)*row*col}$ for FFT; 4) FFT the rows of the matrix; 5) transpose the matrix; and 6) store the rows of the resulting matrix in contiguous order.

This processing can be implemented in the device 100 as follows given a data matrix X. To FFT the columns of X, load the matrix X in a B matrix buffer 144 and load the DFT matrix F in the A matrix buffer 138. Then use matrix matrix point wise multiplication as described herein to perform the multiplication with the twiddle factors. To FFT the rows of X, load the DFT matrix F in a B matrix buffer 144 and the matrix X in the A matrix buffer 138. Note that loading the data matrix X to the A matrix buffer or a B matrix buffer to allow the FFT of columns or rows without transpose. The final transpose of the matrix X can be performed in the MMA 104 or the output formatting 116.

Table 7 is an example illustrating computation of a complex to complex 1D FFT of length 1024 with separate real and imaginary parts. Note that $T_{re}^{32}=F_{re}^{32}$ and $T_{im}^{32}=F_{im}^{32}$. Also, all load operations explicitly mentioned are into a B matrix buffer 144, and with the exception of the initialization load, are performed in parallel with the matrix multiplications. The input formatting 122 is configured to split the inputs into the real and imaginary parts.

TABLE 7

Initialization
    Load $X_{re}^{32,32}$
1. FFT columns
    $Y_{re}^{32,32} = F_{re}^{32} * X_{re}^{32,32}$ and load $X_{im}^{32,32}$
    $Y_{re}^{32,32} -= F_{im}^{32} * X_{im}^{32,32}$
    $Y_{im}^{32,32} = F_{re}^{32} * X_{im}^{32,32}$ and load $X_{re}^{32,32}$
    $Y_{im}^{32,32} += F_{im}^{32} * X_{re}^{32,32}$ and load $Y_{re}^{32,32}$
2. Point wise multiply by twiddle factors
    $X_{re}^{32,32} = T_{re}^{32} \cdot * Y_{re}^{32,32}$ and load $Y_{im}^{32,32}$
    $X_{re}^{32,32} -= T_{im}^{32} \cdot * Y_{im}^{32,32}$
    $X_{im}^{32,32} = T_{re}^{32} \cdot * Y_{im}^{32,32}$ and load $Y_{re}^{32,32}$
    $X_{im}^{32,32} += T_{im}^{32} \cdot * Y_{re}^{32,32}$ and load $F_{re}^{32}$
3. FFT rows
    $Y_{re}^{32,32} = X_{re}^{32,32} * F_{re}^{32}$ and load $F_{im}^{32}$
    $Y_{re}^{32,32} -= X_{im}^{32,32} * F_{im}^{32}$
    $Y_{im}^{32,32} = X_{re}^{32,32} * F_{im}^{32}$ and load $F_{re}^{32}$
    $Y_{im}^{32,32} += X_{im}^{32,32} * F_{re}^{32}$
4. Transpose
    $X_{re}^{32,32} = (Y_{re}^{32,32})^T$
    $X_{im}^{32,32} = (Y_{im}^{32,32})^T$ The device 100 can also be configured to perform one-dimensional (1D) discrete cosign transforms (DCTs) as per y=dct(x). The computation of batch small one-dimensional (1D) discrete cosign transforms (DCTs) and large 1D DCTs is similar to the previously described small and large 1D complex to complex FFTs except that the DCT matrix is real and the data is real. The terms small and large in reference to DCT sizes are used identically as to the terms small and large FFT sizes. Small DCTs can be implemented via matrix vector multiplication. Large DCTs can be implemented via pre-processing (step 1), FFT (step 2) and post processing (step 3) as per:

$x'(n) = x(2*n)$ and $x'(N-1-n) = x(2*n-1)$ for $n = 0, 1, \ldots, N/2-1$     (step 1)

Compute $y' = FFT(x')$     (step 2)

$y(n) = \text{real}\left(\exp\left(-j*n*pi/2*N\right)*y(n)\right)$     (step 3)

Any FFT method can be used to compute step 2 in the above sequence, including the previously described small FFT and large FFT.

The device 100 can also be configured to perform small and large one-dimensional (1D) convolution/filtering as per y=h⊛x. 1D convolution/filtering may be computed as per $$y(n) = \sum h(\tau)*x(n-\tau), \tau = 0, \ldots, L-1; n = L-1, L, \ldots$$

where L is the filter length and τ is the filter coefficient index as per the definition of convolution. A small convolution is one in which L≤32 and a large convolution is one in which L>32. For small 1D convolution, assume the filter length L is in [1, 32] and the output is valid for n≥L−1. Small 1D convolution may be computed in the device 100 as per $$C(t, :) = A(t, :) * B, t = 0, 1, \ldots$$

where $$A(t, :) = [x((33-L)*t) \ldots x((33-L)*t+31)]$$

$$B = [h(L-1) \quad 0\,]$$
$$[h(L-2) \quad h(L-1)]$$
$$[\ldots \quad \ldots\,]$$
$$[h(0) \quad h(1)]$$
$$[0 \quad h(0)]$$
$$[0 \quad 0 \ldots h(L-1) \quad 0 \ldots 0]$$
$$[\ldots \quad \ldots \quad \ldots\,]$$
$$[0 \quad 0 \quad h(0) \quad 0 \ldots 0]$$

$$C(t, :) = [y((33-L)*t+L-1) \ldots y((33-L)*t+31) \quad 0 \ldots 0]$$

Note that in B the last L−1 columns of all rows are zeroes and in C the last L−1 entries are zeroes and the variable t is used to index the number of times that 32−L outputs are generated.

To perform the 1D convolution, the streaming engine 110 is configured to provide elements of the filter h from the L2 cache 106 for initially loading a B matrix buffer 144 with 33−L copies of the filter. Either multiple copies of h are stored in the L2 cache 106 or a single copy is stored in the L2 cache 106 and replicated by configuring the input formatting 122. The streaming engine 108 is configured to read 33−L new values of x(n) from the L2 cache 106 on each cycle and generate A(t,:). The MMA 104 is configured for vector matrix multiplication, and, on each cycle, the MMA 104 computes 33−L values of y(n) in C(t,:).

Figure 14:
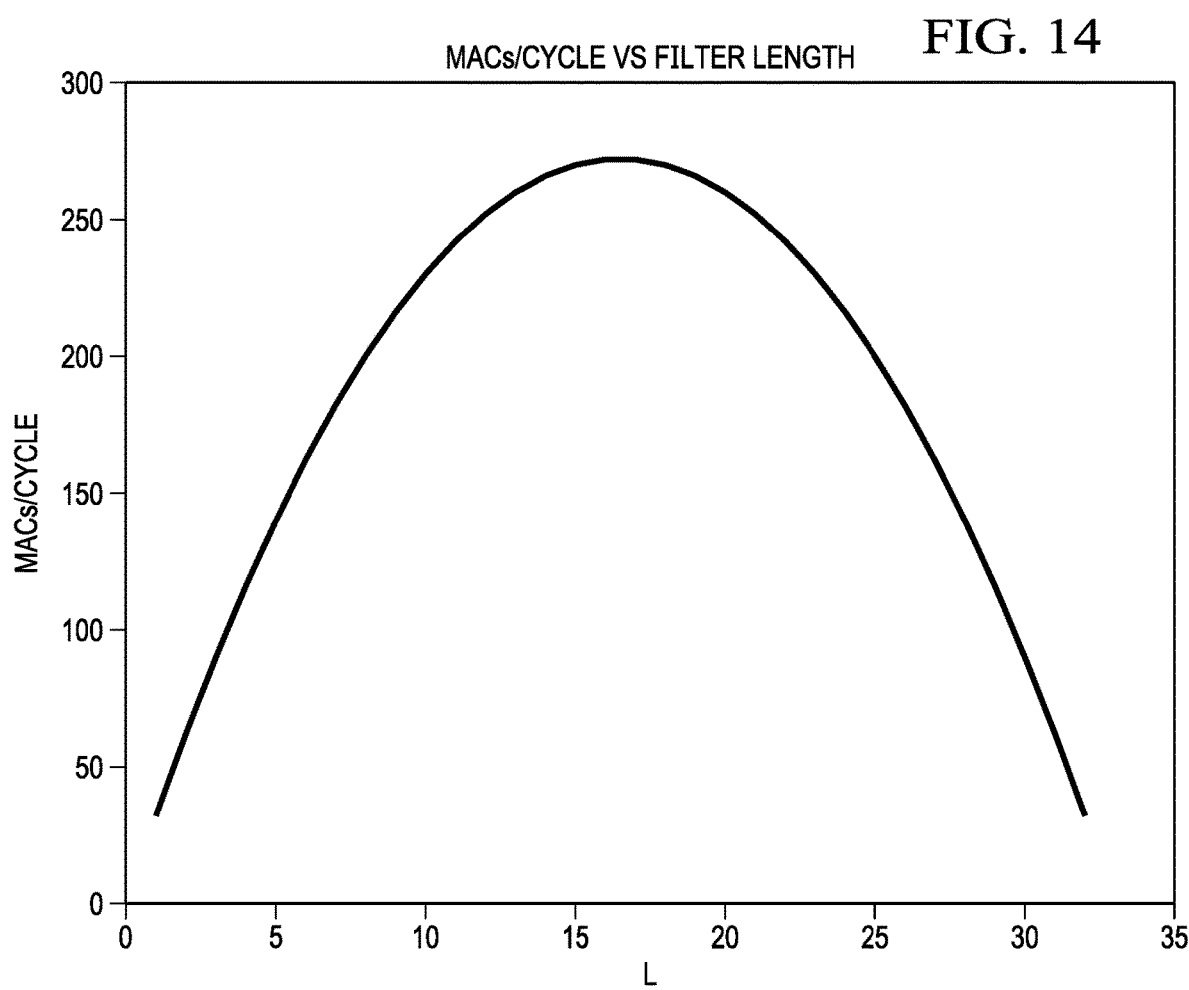
FIG. 14 is a graph illustrating a tradeoff between filter sizes and throughput.

The strategy for computing large 1D convolutions/filters in the device 100 is based on the following observations regarding decomposition of a large filter into two smaller filter fragments:

Let $L = L_1 + L_2$ $h_1(\tau) = h(\tau), \tau = 0, \ldots, L_1 - 1$ $h_2(\tau) = h(\tau + L_1), \tau = 0, \ldots, L_2 - 1$ $$y(n) = \sum h(\tau)*x(n-\tau), = \sum h_1(\tau_1)*x(n-\tau_1) + \sum h_2(\tau_2)*x(n-\tau_2-L_1).$$

where $\tau = 0, \ldots, L-1; n = L-1, L, \ldots$ and $\tau_1 = 0, \ldots, L_1 - 1; \tau_2 = 0, \ldots, L_2 - 1.$ The filter h is broken into smaller fragments using a recursive application of the above decomposition until the sizes of the filter fragments are as optimal as possible, i.e., the filter sizes are chosen as a tradeoff between maximizing the throughput of the MMA 104 and minimizing the total number of filters. The graph of FIG. 14 illustrates the tradeoff between filter fragment sizes and throughput of the MMA 104. As this graph shows, the optimal filter fragment size for the MMA 104 is approximately one half of the width of the buffers 138, 144, i.e., approximately one half the width of the computational primitive size of the MMA 104. In some examples, the decomposition to select the size of the smaller filter fragments is performed offline. In some examples, the decomposition is performed by the processor 102. Appropriately shifted versions of the input as per the above equations are filtered with the corresponding filter fragments and the results are added. The filtering is implemented using vector matrix multiplication as previously described.

The device 100 can also be configured to perform 1D correlation as per y=h★x. Correlation is the same as convolution with the filter coefficients in time reversed order. Thus, the 1D correlation can be implemented using small or large 1D convolution as previously described in which the input formatting 122 is configured to perform the time reversal on either h or x.

The device 100 can also be configured to implement matrix assignment as per C=A or C=B. That is, assignment can be performed in the MMA 104 as C=A*I or C=I*B where I is the identity matrix.

The device 100 can also be configured to implement matrix transpose $B^T$. The transpose of a matrix is a new matrix in which the columns are the rows of the original matrix. To perform the transpose operation, the MMA 104 includes an operation mode, i.e., a copy operation, that specifies that elements in the A matrix buffer 138 are to be copied to a designated column of a B matrix buffer 144.

To perform the transpose of a matrix, the streaming engine 108 is configured to read the elements of rows of the matrix from the L2 cache 106 and provide each row of the matrix in turn for loading in a B matrix buffer 144. That is, the first vector from the streaming engine 108 will contain the first row, row 0, of the matrix, the second vector from the streaming engine will contain the second row of the matrix, etc. Appropriately configured LSE instructions that load the rows of the matrix from the buffer 124 and store the elements in successive columns of a B matrix buffer 144 are then executed. Once all rows of the matrix have been transposed, appropriately configured LSE instructions are executed to move the contents of the B matrix buffer to a C matrix buffer 134 and out of the MMA 104.

Other Examples

While the disclosure has been described with respect to a limited number of examples, other examples can be devised which do not depart from the scope of the disclosure as disclosed herein.

Examples have been described herein in which the processor is a DSP and executes the control software that configures the device 100 to perform a fundamental computational primitive and controls the execution of the primitive. In other examples, a host processor coupled to the device 100 performs some or all of the control operations needed to execute the fundamental computational primitives. The processor may be any suitable type and combination of electronic data processors. For example, the processor can be one or more processors from Intel Corp. or Advanced Micro Devices, Inc., one or more Reduced Instruction Set Computers (RISC), one or more Application-Specific Integrated Circuits (ASIC), one or more digital signal processors (DSP), or the like.

Examples have been described herein in which buffer dimensions in the MMA are 1×32 or 32×32. In other examples, the buffer dimensions in the MMA can be smaller or larger.

It is therefore contemplated that the appended claims will cover any such modifications of the examples as fall within the true scope of the disclosure.

The invention claimed is:

1. A device comprising:
a memory;
a processor coupled to the memory; and
a matrix multiplication accelerator (MMA) coupled to the processor and including a multiplier matrix buffer and a multiplicand matrix buffer,
wherein the device is operable to:
receive a data vector including a filter of a length greater than a width of the multiplicand matrix buffer;
decompose the filter into a plurality of smaller filters, wherein sizes of the smaller filters are less than the width of the multiplicand matrix buffer;
format the data vector based on a computational primitive; and
configure, based on the computational primitive, the MMA to format the data vector.

2. The device of claim 1, wherein the processor is configurable to decompose the filter into the plurality of smaller filters.

3. The device of claim 1,
wherein the data vector comprises a row of a matrix, and
wherein the MMA is configurable to execute the computational primitive by at least copying the data vector to a column in the multiplicand matrix buffer.

4. The device of claim 1, wherein the device is operable to configure the MMA to offset load data in the multiplicand matrix buffer.

5. The device of claim 1,
wherein the MMA is configurable to execute the computational primitive to generate an output, and
wherein the processor is configurable to add zero padding to the output of the MMA.

6. The device of claim 1,
wherein the MMA is configurable to execute the computational primitive to generate an output, and
wherein the processor is configurable to perform seam removal on the output of the MMA.

7. The device of claim 1,
wherein the MMA is configurable to execute the computational primitive to generate an output, and
wherein the processor is configurable to perform column subsampling on the output of the MMA according to a specified stride.

8. The device of claim 1, further comprising a streaming engine configurable to tile data of a plurality of feature maps into a filtering matrix.

9. The device of claim 8,
wherein the MMA is configurable to execute the computational primitive to generate an output, and
wherein a size of a tile of data is selected such that no seam is present in the output of the MMA.

10. The device of claim 8,
wherein the MMA is configurable to execute the computational primitive to generate an output, and
wherein a size of a tile of data is selected such that a seam is always in a same location in the output of the MMA.

11. The device of claim 1,
wherein the data vector includes complex numbers,
wherein a real part and an imaginary part of the complex numbers are stored interleaved in the memory, and
wherein the processor is configurable to split each complex number into the real part and the imaginary part for loading into the MMA.

12. The device of claim 1,
wherein the computational primitive is a fast Fourier transform (FFT), and
wherein the MMA is configurable to execute the computational primitive by at least:
loading a discrete Fourier transform (DFT) matrix in the multiplier matrix buffer;
loading a data matrix in the multiplicand matrix buffer to perform the FFT on columns of the data matrix; and
loading the data matrix in the multiplier matrix buffer and the DFT matrix into the multiplicand matrix buffer to perform the FFT on rows of the data matrix.

13. The device of claim 1, wherein the sizes of the smaller filters are selected as a tradeoff between maximizing a throughput of the MMA and minimizing a total number of smaller filters.

14. A method for performing a computational primitive in a device comprising a processor and a matrix multiplication accelerator (MMA), the method comprising:
receiving a data vector including a filter of a length greater than a width of a multiplicand matrix buffer in the MMA;
decomposing the filter into a plurality of smaller filters, wherein sizes of the smaller filters are less than the width of the multiplicand matrix buffer;
formatting the data vector based on the computational primitive; and
configuring, based on the computational primitive, the MMA to format the data vector.

15. The method of claim 14,
wherein the data vector comprises a row of a matrix, and
wherein the method further comprises executing the computational primitive by at least copying the data vector to a column in the multiplicand matrix buffer.

16. The method of claim 14, further comprising:
executing the computational primitive to generate an output; and
adding zero padding to the output of the MMA.

17. The method of claim 14, further comprising:
executing the computational primitive to generate an output; and
performing seam removal on the output of the MMA.

18. The method of claim 14, further comprising:
executing the computational primitive to generate an output; and
performing column subsampling on the output of the MMA according to a specified stride.

19. The method of claim 14, further comprising:
executing the computational primitive to generate an output;
tiling data of a plurality of feature maps into a filtering matrix; and
selecting a size of a tile of data such that no seam is present in the output of the MMA.

20. The method of claim 14,
wherein the computational primitive is a fast Fourier transform (FFT), and
wherein the method further comprises executing the computational primitive by at least:
loading a discrete Fourier transform (DFT) matrix in the multiplier matrix buffer;
loading a data matrix in the multiplicand matrix buffer to perform the FFT on columns of the data matrix; and
loading the data matrix in the multiplier matrix buffer and the DFT matrix into the multiplicand matrix buffer to perform the FFT on rows of the data matrix.

* * * * *